United States Patent
Zhang

(10) Patent No.: US 10,942,999 B2
(45) Date of Patent: Mar. 9, 2021

(54) VERIFICATION METHOD, VERIFICATION DEVICE, ELECTRONIC DEVICE AND COMPUTER READABLE STORAGE MEDIUM

(71) Applicant: GUANGDONG OPPO MOBILE TELECOMMUNICATIONS CORP., LTD., Guangdong (CN)

(72) Inventor: Xueyong Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 98 days.

(21) Appl. No.: 16/424,426

(22) Filed: May 28, 2019

(65) Prior Publication Data
US 2019/0377856 A1    Dec. 12, 2019

(30) Foreign Application Priority Data

Jun. 6, 2018 (CN) .......................... 201810574771.X
Jun. 6, 2018 (CN) .......................... 201810575116.6

(51) Int. Cl.
*G06F 21/00* (2013.01)
*G06F 21/32* (2013.01)
(Continued)

(52) U.S. Cl.
CPC ......... *G06F 21/32* (2013.01); *G06K 9/00255* (2013.01); *G06K 9/00288* (2013.01);
(Continued)

(58) Field of Classification Search
None
See application file for complete search history.

(56) References Cited

U.S. PATENT DOCUMENTS 8,811,692 B2 * 8/2014 Prokoski ............... G06F 19/321
                                                                382/128
9,886,845 B2 * 2/2018 Rhoads .............. H04N 5/23219
(Continued)

FOREIGN PATENT DOCUMENTS

CN       102622588       8/2012
CN       105554196       5/2016
(Continued)

OTHER PUBLICATIONS

EPO, Office Action for EP Application No. 19178415.6, dated Nov. 7, 2019.
(Continued)

*Primary Examiner* — Maung T Lwin
(74) *Attorney, Agent, or Firm* — Hodgson Russ LLP

(57) ABSTRACT

The present disclosure provides a verification method, a verification device, an electronic device and a computer readable storage medium. The verification method includes: determining whether the movable component is triggered; when the movable component is triggered, moving the infrared camera and the structured light projector toward the outside of the housing along with the bracket to extend from the housing, and initializing the infrared camera and the structured light projector; obtaining an infrared image by the infrared camera; determining whether a human face exists in the infrared image; if yes, determining whether the human face matches the face template of the authorized user, obtaining a laser pattern by the structured light projector and the infrared camera, obtaining a depth image according to the laser pattern, and determining whether the depth image matches the depth template of the authorized user; when both match, determining that the verification is passed.

20 Claims, 16 Drawing Sheets

(51) Int. Cl.
    *G06T 7/521*     (2017.01)
    *G06K 9/00*     (2006.01)
    *G06K 9/62*     (2006.01)
    *H04N 5/225*     (2006.01)

(52) U.S. Cl.
    CPC ............ *G06K 9/6202* (2013.01); *G06T 7/521* (2017.01); *H04N 5/2253* (2013.01); *H04N 5/2257* (2013.01); *G06T 2207/10028* (2013.01); *G06T 2207/10048* (2013.01); *G06T 2207/30201* (2013.01)

(56) References Cited

U.S. PATENT DOCUMENTS

| | | | |
|---|---|---|---|
| 10,579,865 B2* | 3/2020 | Yoo | G06F 21/32 |
| 2004/0158724 A1* | 8/2004 | Carr | B42D 25/333 713/186 |
| 2014/0197922 A1* | 7/2014 | Stanwood | G06F 21/32 340/5.83 |
| 2014/0237587 A1 | 8/2014 | Forbes et al. | |
| 2015/0339471 A1* | 11/2015 | Bennett | G06F 21/32 726/19 |
| 2016/0309329 A1 | 10/2016 | Chen et al. | |
| 2017/0053109 A1 | 2/2017 | Han et al. | |
| 2017/0070680 A1 | 3/2017 | Kobayashi | |
| 2017/0126937 A1* | 5/2017 | Evans | H04N 5/2257 |
| 2017/0316195 A1* | 11/2017 | Rieul | G06K 9/2018 |
| 2018/0130168 A1 | 5/2018 | Nayshtut et al. | |

FOREIGN PATENT DOCUMENTS

| | | |
|---|---|---|
| CN | 205320124 | 6/2016 |
| CN | 106991377 | 7/2017 |
| CN | 107729836 | 2/2018 |
| CN | 107766824 | 3/2018 |
| CN | 107832677 | 3/2018 |
| CN | 108924340 | 11/2018 |
| CN | 108959880 | 12/2018 |
| CN | 109246361 | 1/2019 |

OTHER PUBLICATIONS

SIPO, Notice of Allowance for CN application 201810575116.6 (dated Jul. 22, 2020), 6 pages (including translation).
SIPO, First Office Action for CN Application No. 201810574771.X, dated Jun. 27, 2019.
SIPO, First Office Action for CN Application No. 201810575116.6, dated Jul. 3, 2019.
WIPO, English translation of the ISR and WO for PCT/CN2019/083370, dated Jun. 18, 2019.
SIPO, Second Office Action for CN Application No. 201810574771.X, dated Nov. 27, 2019.
SIPO, Decision of Rejection for CN Application No. 201810574771.X, dated Apr. 2, 2020.
SIPO, Decision of Rejection for CN Application No. 201810575116.6, dated Apr. 2, 2020.
IPI, Office Action for IN Application No. 201914022132, dated Oct. 20, 2020.

* cited by examiner

VERIFICATION METHOD, VERIFICATION DEVICE, ELECTRONIC DEVICE AND COMPUTER READABLE STORAGE MEDIUM

CROSS REFERENCE TO RELATED APPLICATIONS

This application claims priority to Chinese Patent Application Nos. 201810575116.6 and 201810574771.X, each filed Jun. 6, 2018, the entire disclosures of which are incorporated herein by reference.

FIELD

The present application relates to a field of consumer electronics technology, and more particularly, to a verification method, a verification device, an electronic device and a computer readable storage medium.

BACKGROUND

The existing camera component for face unlocking is generally disposed on a front case of a mobile phone, such that a display screen disposed on the front case cannot be made into a full screen.

SUMMARY

Embodiments of the present disclosure provide a verification method, a verification device, an electronic device and a computer readable storage medium.

The verification method of the present disclosure includes: determining whether a movable component is triggered, wherein the movable component is received in a housing and capable of extending out from the housing, the movable component includes a bracket, an infrared camera disposed on the bracket and a structured light projector disposed on the bracket; when the movable component is triggered, moving the infrared camera and the structured light projector toward the outside of the housing along with the bracket to extend out from the housing, and initializing the infrared camera and the structured light projector; obtaining an infrared image by the infrared camera; determining whether a human face exists in the infrared image; when a human face exists in the infrared image, determining whether the human face matches a face template of an authorized user, obtaining a laser pattern by the structured light projector and the infrared camera, obtaining a depth image according to the laser pattern, and determining whether the depth image matches a depth template of the authorized user; and when the human face matches the face template of the authorized user, and the depth image matches the depth template of the authorized user, determining that verification is passed.

The electronic device of the present disclosure includes a housing, a movable component and a processor. The movable component is received in the housing and capable of extending out from the housing. The movable component includes a bracket, an infrared camera disposed on the bracket and a structured light projector disposed on the bracket. When the movable component is triggered, the bracket is configured to move toward the outside of the housing along with the infrared camera and the structured light projector to enable the infrared camera and the structured light projector to extend out from the housing, and the infrared camera and the structured light projector are configured to be initialized. The infrared camera is configured to obtain an infrared image. The infrared camera and the structured light projector are configured to obtain a laser pattern. The processor is configured to: determine whether the movable component is triggered; determine whether a human face exists in the infrared image; when a human face exists in the infrared image, determine whether the human face matches a face template of an authorized user, obtain a depth image according to the laser pattern, and determine whether the depth image matches a depth template of the authorized user; and when the human face matches the face template of the authorized user, and the depth image matches the depth template of the authorized user, determine that verification is passed.

The verification device of the present disclosure includes a memory and a processor. The memory is configured to store instructions executable by the processor. The processor is configured to run a program corresponding to the instructions by reading the instructions stored in the memory, so as to: determine whether a movable component is triggered, wherein the movable component is received in the housing and capable of extending out from the housing, the movable component comprises a bracket, an infrared camera disposed on the bracket and a structured light projector disposed on the bracket; when the movable component is triggered, control the bracket to move toward the outside of the housing together with the infrared camera and the structured light projector to enable the infrared camera and the structured light projector to extend out from the housing, and control the infrared camera and the structured light projector to be initialized; control the infrared camera to obtain an infrared image; determine whether a human face exists in the infrared image; when a human face exists in the infrared image, determine whether the human face matches a face template of an authorized user, control the infrared camera and the structured light projector to obtain a laser pattern, obtain a depth image according to the laser pattern, and determine whether the depth image matches a depth template of the authorized user; and determine that verification is passed, when the human face matches the face template of the authorized user, and the depth image matches the depth template of the authorized user.

The computer readable storage medium of the present disclosure includes one or more computer executable instructions. When the one or more computer executable instructions are executed by one or more processors, the verification method according to embodiments of the present disclosure is performed.

Additional aspects and advantages of the present disclosure will be given in part in the following descriptions, become apparent in part from the following descriptions, or be learned from the practice of the embodiments of the present disclosure.

DESCRIPTION OF THE FIGURES

In order to more clearly illustrate the embodiments of the present disclosure or the technical solutions in the related art, the drawings used in the embodiments or the related art will be briefly described below. Obviously, the drawings in the following description are only certain embodiments of the present disclosure, and other drawings can be obtained according to the drawings by those skilled in the art, without inventive work.

MODE OF CARRYING OUT THE INVENTION

Figure 1:
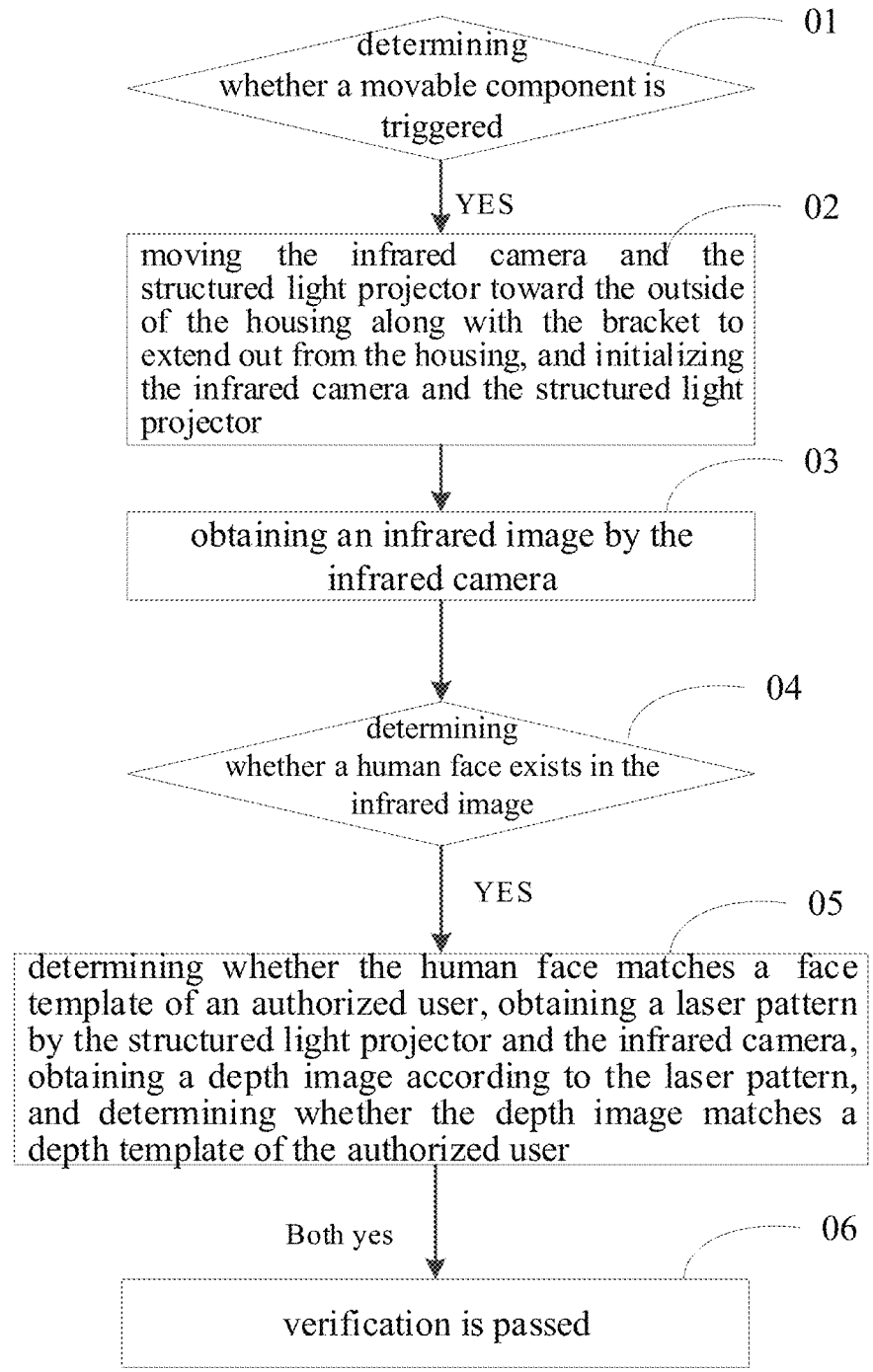
FIG. 1 is a schematic flow chart of a verification method according to embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In addition, it is to be understood that, terms such as "first" and "second" are used herein for purposes of description and are not intended to indicate or imply relative importance or significance of the listed feature. Furthermore, the feature defined with "first" and "second" may include one or more this feature distinctly or implicitly. In the description of the present disclosure, "a plurality of" means two or more than two, unless specified otherwise.

In the present disclosure, unless specified or limited otherwise, the terms of "installation", "linkage" and "connection" shall be understood broadly, for example, it could be permanent connection, or could be removable connection or integral connection; it could be mechanical connection, or could be electric connection, or could communicate with each other; it could be direct linkage, or could be indirect linkage via intermediate media, or could be interlink between two elements or interactive relationship between two elements. Those of ordinary skill in the art shall understand the concrete notations of the terms mentioned above in the present disclosure according to specific circumstances.

Many different embodiments or examples are provided in the following to implement different structures of the present disclosure. To simplify the present disclosure, the components and settings of specific examples are provided below. Of course, they are merely examples, and are not intended to limit the present disclosure. Furthermore, reference numbers and/or reference letters may be repeated in different examples of the present disclosure. Such repetitions are for simplification and clearness, rather than indicating the relations of the discussed embodiments and/or settings. Moreover, the present disclosure provides examples of various specific processes and materials, but the applicability of other processes and/or application of other materials may be appreciated by those having ordinary skill in the art.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

Figure 2:
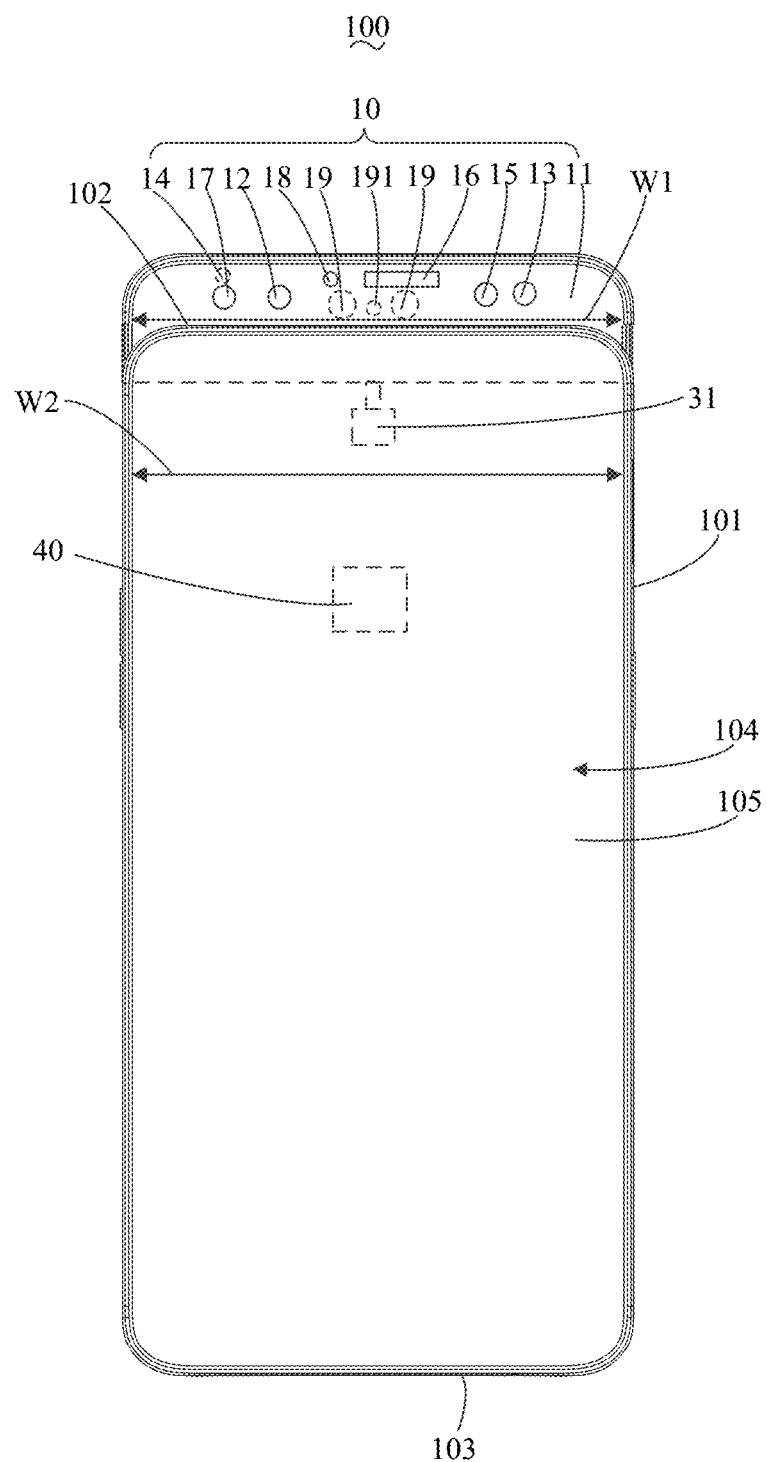
FIGS. 2-3 are schematic diagrams of an electronic device according to embodiments of the present disclosure.
Figure 3:
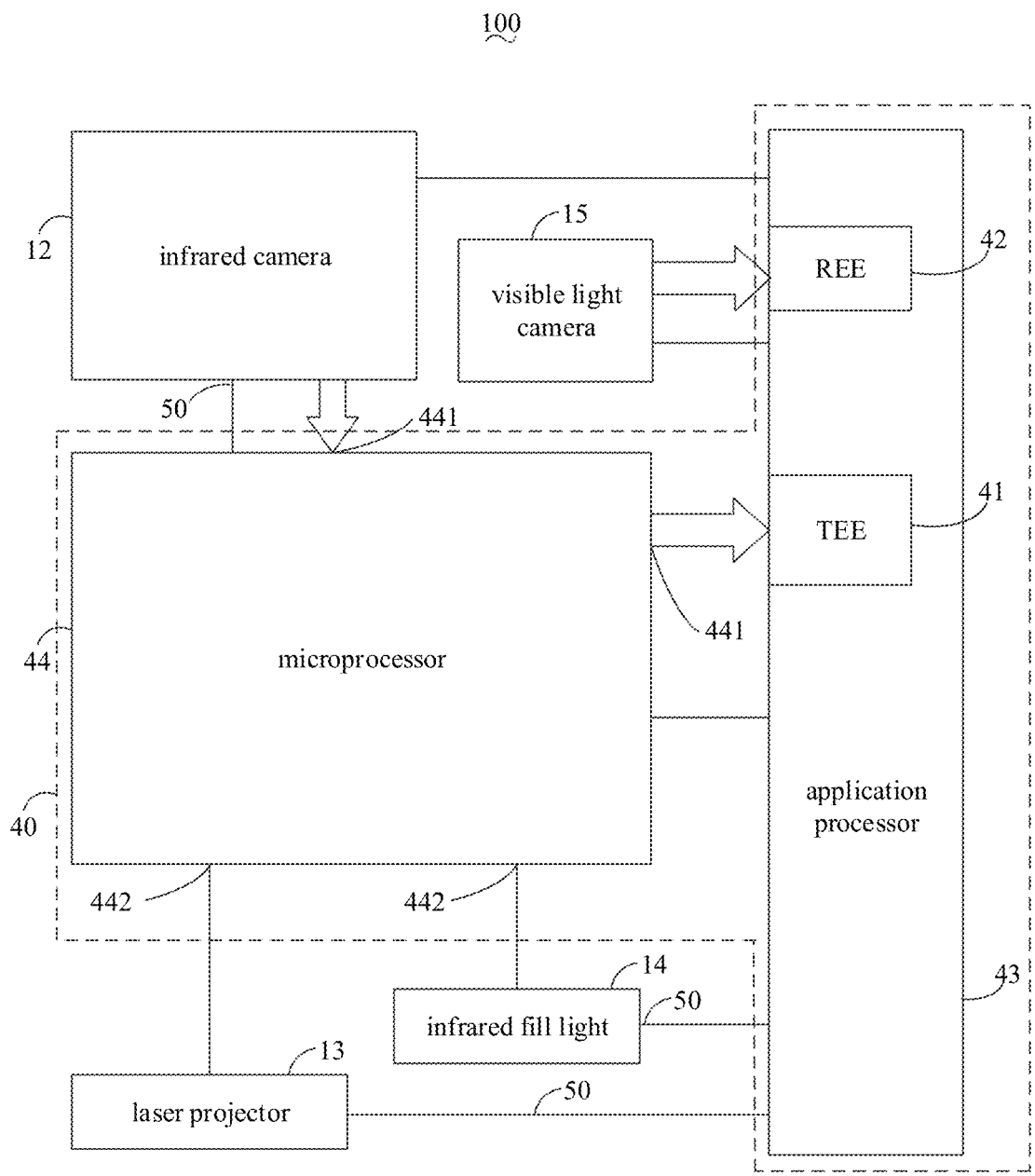

As illustrated in FIGS. 1-3, the verification method of embodiments of the present disclosure includes the following operations.

At block 01, it is determined whether a movable component 10 is triggered. The movable component 10 is received in a housing 101 and capable of extending out from the housing 101. The movable component 10 includes a bracket 11, an infrared camera 12 disposed on the bracket 11, and a structured light projector 13 disposed on the bracket 11.

At block 02, when the movable component 10 is triggered, the bracket 11 is moved toward the outside of the housing along with the infrared camera 12 and the structured light projector 13 to enable the infrared camera 12 and the structured light projector 13 to extend out from the housing 101, and the infrared camera 12 and the structured light projector 13 are initialized.

At block 03, an infrared image is obtained by the infrared camera 12.

At block 04, it is determined whether a human face exists in the infrared image.

At block 05, when a human face exists in the infrared image, it is determined whether the human face matches a face template of an authorized user, a laser pattern is obtained by the structured light projector 13 and the infrared camera 12, a depth image is obtained according to the laser pattern, and it is determined whether the depth image matches a depth template of the authorized user.

At block 06, when the human face matches the face template of the authorized user, and the depth image matches the depth template of the authorized user, it is determined that verification is passed.

As illustrated in FIGS. 2 and 3, the electronic device 100 of embodiments of the present disclosure includes a housing 101, a movable component 10, and a processor 40. The movable component 10 includes a bracket 11, an infrared camera 12, and a structured light projector 13. The processor 40 is coupled to the infrared camera 12 and the structured light projector 13 respectively. The movable component 10 is received in the housing 101 and capable of extending out from the housing 101. In detail, the housing 101 includes a head portion 102 and a tail portion 103 opposed to the head portion 102. The housing 101 further includes a front surface 104 coupling to the head portion 102 and the tail portion 103 respectively, and a back surface (not shown) opposed to the front surface 104. A display screen 105 is provided on the front surface 104. The display screen 105 is a full screen. The movable component 10 is disposed at the end of the housing 101 where the head portion 102 is. The electronic device 100 includes any one of a mobile phone, a tablet computer, a smart bracelet, and a smart helmet. The electronic device 100 of embodiments of the present disclosure is exemplified by taking a mobile phone as an example.

The processor 40 is configured to: determine whether the movable component 10 is triggered; when the movable component 10 is triggered and the infrared camera 12 is configured to obtain an infrared image, determine whether a human face exists in the infrared image; when the human face exists in the infrared image, determine whether the human face matches the face template of the authorized user; obtain the depth image according to the laser pattern; determine whether the depth image matches the depth template of the authorized user; when the human face matches the face template of the authorized user, and the depth image matches the depth template of the authorized user, determine that the verification is passed. In other words, the acts at blocks 01, 04, 05 and 06 may be implemented by the processor 40.

Figure 4:
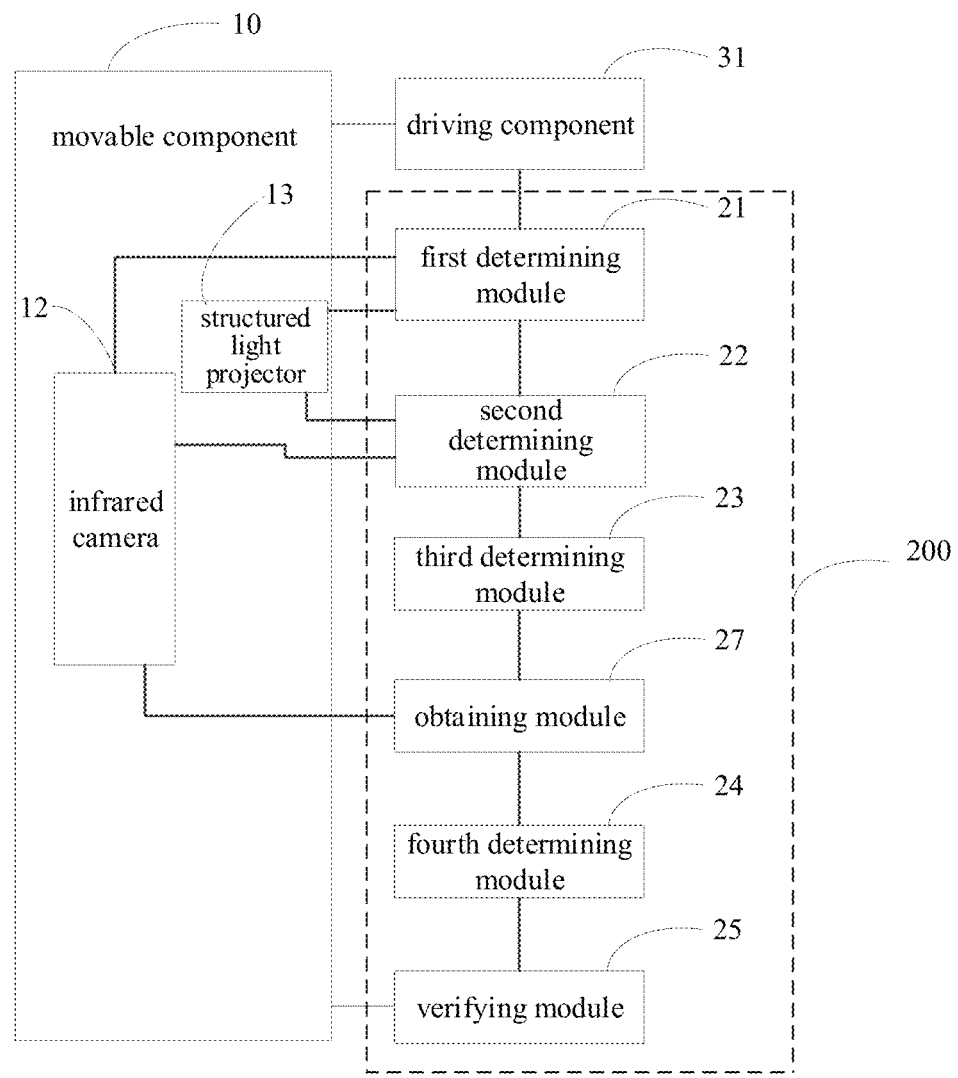
FIG. 4 is a schematic diagram of a verification device according to embodiments of the present disclosure.

As illustrated in FIG. 4, embodiments of the present disclosure further provide a verification device 200. The verification device 200 includes a first determining module 21, a second determining module 22, a third determining module 23, a fourth determining module 24, a verifying module 25 and an obtaining module 27.

The first determining module 21 is configured to determine whether the movable component 10 is triggered. In other words, the act at block 01 may be implemented by the first determining module 21.

The second determining module 22 is configured to determine whether the human face exists in the infrared image after the infrared camera 12 obtains the infrared image. In other words, the act at block 04 may be implemented by the second determining module 22.

The third determining module 23 is configured to determine whether the human face matches the face template of the authorized user, when the human face exists in the infrared image.

The obtaining module 27 is configured to obtain the depth image according to the laser pattern.

The fourth determining module 24 is configured to determine whether the depth image matches the depth template of the authorized user.

The verifying module 25 is configured to determine that the verification is passed, when the human face matches the face template of the authorized user, and the depth image matches the depth template of the authorized user. In other words, the act at block 06 may be implemented by the verifying module 25.

In the verification device 200, the electronic device 100, and the verification method of embodiments of the present disclosure, when the movable component 10 is triggered, the infrared camera 12 and the structured light projector 13 are driven to move toward the outside of the housing 101 with the bracket 11 to extend out from the housing 101, and the infrared camera 12 and the structured light projector 13 are initialized, such that the infrared image may be obtained once the infrared camera 12 and the structured light projector 13 moves into position outside of the housing 101, which reduces the execution time of the verification method and improves the verification speed.

In a first embodiment of the present disclosure, when a human face exists in the infrared image, determining whether the face matches the face template of the authorized user, obtaining the laser pattern by the structured light projector 13 and the infrared camera 12, obtaining the depth image according to the laser pattern, and determining whether the depth image matches the depth template of the authorized user (the act at block 05), includes the following operations.

At block 051, when a human face exists in the infrared image, it is determined whether the human face matches the face template of an authorized user.

At block 052, when the human face matches the face template of the authorized user, the laser pattern is obtained by the structured light projector 13 and the infrared camera 12, the depth image is obtained according to the laser pattern, and it is determined whether the depth image matches the depth template of the authorized user.

Figure 5:
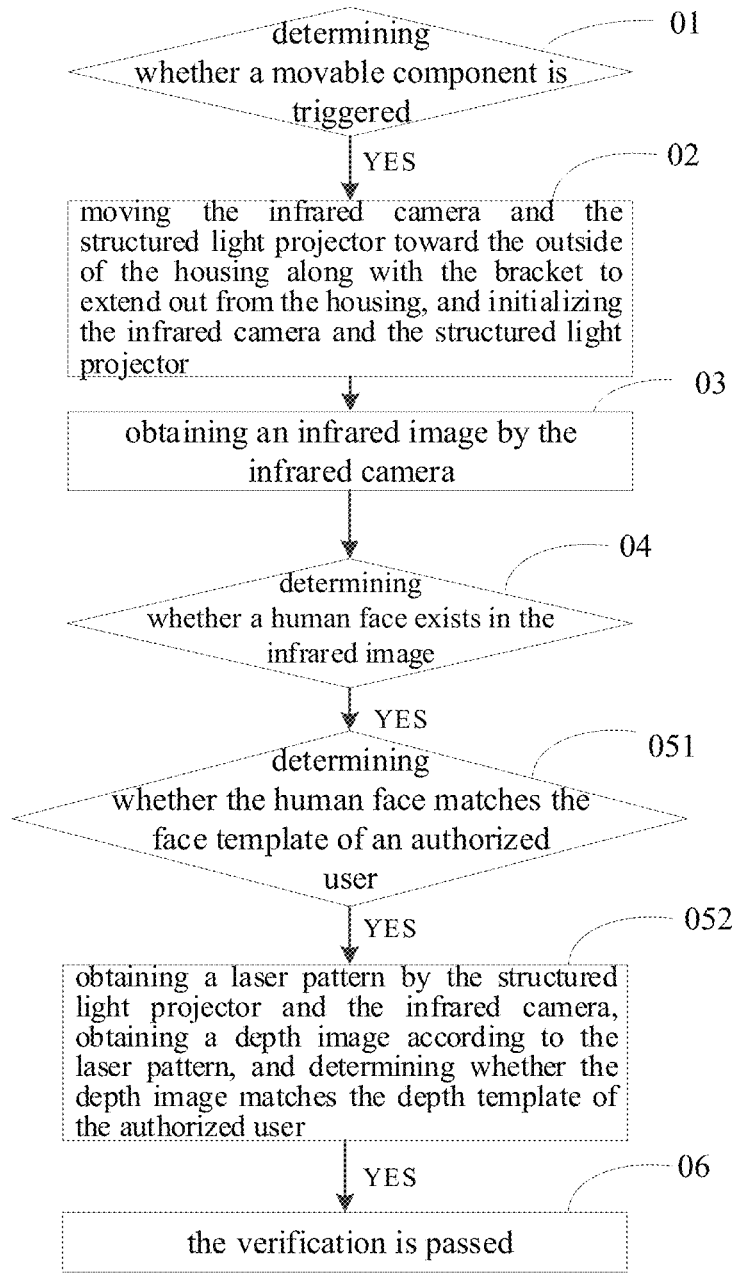
FIGS. 5-10 are schematic flow charts of a verification method according to embodiments of the present disclosure.

As illustrated in FIGS. 1, 3 and 5, the verification method according to the first embodiment of the present disclosure includes the following operations.

At block 01, it is determined whether the movable component 10 is triggered. The movable component 10 is received in the housing 101 and capable of extending out from the housing 101. The movable component 10 includes the bracket 11, the infrared camera 12 disposed on the bracket 11, and the structured light projector 13 disposed on the bracket 11.

At block 02, when the movable component 10 is triggered, the bracket 11 is moved toward the outside of the housing 101 along with the infrared camera 12 and the structured light projector 13 to enable the infrared camera 12 and the structured light projector to extend out from the housing 101, and the infrared camera 12 and the structured light projector 13 are initialized.

At block 03, the infrared image is obtained by the infrared camera 12.

At block 04, it is determined whether a human face exists in the infrared image.

At block 051, when a human face exists in the infrared image, it is determined whether the human face matches the face template of the authorized user.

At block 052, when the human face matches the face template of the authorized user, the laser pattern is obtained by the structured light projector 13 and the infrared camera 12, the depth image is obtained according to the laser pattern, and it is determined whether the depth image matches the depth template of the authorized user.

At block 06, when the depth image matches the depth template of the authorized user, it is determined that the verification is passed.

The act at block 02 includes the followings.

At block 021, the infrared camera 12 and the structured light projector 13 are driven to move toward the outside of the housing 101 along with the bracket to extend out from the housing 101.

At block 022, the infrared camera 12 and the structured light projector 13 are initialized.

The act at block 052 includes the followings.

At block 0521, when the human face matches the face template of the authorized user, the laser pattern is obtained by the structured light projector 13 and the infrared camera 12.

At block 0522, the depth image is obtained according to the laser pattern.

At block 0523, it is determined whether the depth image matches the depth template of the authorized user.

As illustrated in FIGS. 2 and 3, the electronic device 100 of embodiments of the present disclosure includes the housing 101, the movable component 10, and the processor 40. The movable component 10 includes the bracket 11, the infrared camera 12, and the structured light projector 13. The processor 40 is coupled to the infrared camera 12 and the structured light projector 13 respectively. The movable component 10 is received in the housing 101 and capable of extending out from the housing 101. In detail, the housing 101 includes the head portion 102 and the tail portion 103 opposed to the head portion 102. The housing 101 further includes the front surface 104 coupling the head portion 102 and the tail portion 103, and the back surface (not shown) opposed to the front surface 104. The display screen 105 is provided on the front surface 104. The display screen 105 is a full screen. The movable component 10 is disposed at the end of the housing 101 where the head portion 102 is. The electronic device 100 includes any one of a mobile phone, a tablet computer, a smart bracelet, and a smart helmet. The electronic device 100 of embodiments of the present disclosure is exemplified by taking a mobile phone as an example.

The processor 40 is configured to: determine whether the movable component 10 is triggered; when the movable component 10 is triggered and the infrared camera 12 obtains the infrared image, determine whether a human face exists in the infrared image; when a human face exists in the infrared image, determine whether the human face matches the face template of the authorized user; when the human face matches the face template of the authorized user and the structured light projector 13 and the infrared camera 12 obtains the laser pattern, obtain the depth image according to the laser pattern, and determine whether the depth image matches the depth template of the authorized user; and when the depth image matches the depth template of the authorized user, determine that the verification is passed. In other words, the acts at blocks 01, 04, 051, 0522, 0523 and 06 may be implemented by the processor 40.

When the movable component 10 is triggered, the bracket 11 moves toward the outside of the housing 101 along with the infrared camera 12 and the structured light projector 13 to enable the infrared camera 12 and the structured light projector 13 to extend out from the housing 101. The infrared camera 12 and the structured light projector 13 are initialized. In other words, the act at block 021 may be implemented by the bracket 11, and the act at block 02 may be implemented by the infrared camera 12 and the structured light projector 13 together. First, the bracket 11 moves toward the outside the housing 101 along with the infrared camera 12 and the structured light projector 13 to enable the infrared camera 12 and the structured light projector 13 to extend out from the housing 101, and then the infrared camera 12 and the structured light projector 13 are initialized. In other words, the act at block 021 is executed before the act at block 022. In another case, the bracket 11 moves toward the outside of the housing 101 along with the infrared camera 12 and the structured light projector 13 to the infrared camera 12 and the structured light projector 13 to extend out from the housing 101, and at the same time, the infrared camera 12 and the structured light projector 13 are initialized. In other words, the acts at blocks 021 and 022 are executed at the same time, which brings the preparation (initialization) time of the infrared camera 12 and the structured light projector 13 forward to reduce the overall execution time of the verification method, compared to performing the act at block 021 before the act at block 022.

The infrared camera 12 is capable of obtaining the infrared image. In detail, the infrared camera 12 is configured to obtain the infrared image after the movable component 10 is triggered. In other words, the act at block 03 may be implemented by the infrared camera 12.

The infrared camera 12 and the structured light projector 13 may be configured together to obtain the laser pattern. In detail, the infrared camera 12 and the structured light projector 13 are configured together to obtain the laser pattern, when the human face matches the face template of the authorized user. In other words, the act at block 0521 may be implemented by the infrared camera 12 and the structured light projector 13 together.

The operation of triggering the movable component 10 includes: moving and/or turning the electronic device 100 in a predetermined manner (e.g., the user turns the head portion 102 toward the side of the front surface 104); lighting up the display screen 105 (e.g., when the display screen 105 is in a black-out state, the user lights up the display screen 105 by pressing a button on the electronic device 100 or the user lights up the display screen 105 by double clicking on the display screen 105); opening the face detection application in the electronic device 100 (e.g., the user opens/clicks the face detection application or software in the electronic device 100, in detail, when the user uses the electronic device 100, the user may open the user verification software in the electronic device 100 to identify the face of the user to determine whether the user has the right to use the electronic device 100); and clicking a button/key for starting the face detection in the running application in the electronic device 100 (e.g., when the user uses the payment software, the user clicks a button in the payment software to make payment by scanning the face). In detail, the operation of triggering the movable component 10 is also an operation of starting the infrared camera 12 and the structured light projector 13. In other words, the infrared camera 12 and the structured light projector 13 are turned on when the user performs the above operations (moving and/or turning the electronic device 100 in a predetermined manner, lighting up the display screen 105, opening the face detection application in the electronic device 100, clicking a button/key for starting the face detection in the running application in the electronic device 100), and the initialization operation starts after the infrared camera 12 and the structured light projector 13 are turned on. When the user needs to perform face recognition using the infrared camera 12 and the structured light projector 13, the user performs the above operations (moving and/or turning the electronic device 100 in a predetermined manner, lighting up the display screen 105, opening the face detection application in the electronic device 100, clicking a button/key for starting the face detection application in the running application in the electronic device 100) that generate a trigger signal for triggering the movable component 10, and the processor 40 may determine whether the movable component 10 is triggered according to whether the trigger signal is received.

The electronic device 100 further includes a driving component 31 disposed within the housing 101 and coupled to the bracket 11. The driving component 31 is configured to drive the bracket 11 to move. The driving component 31 includes a drive motor. The processor 40 is coupled to the driving component 31, and controls the driving component 31 to drive the movable component 10 to move, when the movable component 10 is triggered.

The initialization of the infrared camera 12 and the structured light projector 13 includes starting the driving procedure of the infrared camera 12 to prepare the infrared camera 12 for shooting, and starting the driving procedure of the structured light projector 13 to prepare the structured light projector 13 for projecting the infrared laser.

The infrared camera 12 may obtain an infrared image, when the bracket 11 moves into position and stops moving. Since the infrared image is obtained when the bracket 11 is stable, the infrared image is relatively clear, which is advantageous for performing subsequent face determination and reduces repeated shooting of infrared images. The infrared camera 12 may also obtain the infrared image when the infrared camera 12 is completely exposed outside the housing 101, and the bracket 11 has not stopped moving. For example, when the infrared camera 12 is completely exposed outside of the housing 101 and the moving speed of the bracket 11 is less than one-third of the maximum speed of the bracket 11, the infrared camera 12 obtains the infrared image, and thus, the time for shooting the image is advanced, which further reduces the overall execution time of the verification method, and improves the user experience.

The act of determining whether a human face exists in the infrared image may include: performing feature extraction on the infrared image by using a specific algorithm, matching the extracted feature with a known face feature vector, and determining whether the infrared image is a face image according to the matching result. The features of the infrared image may be extracted by an active shape model (ASM), a local binary patterns (LBP) algorithm, a principal component analysis (PCA) algorithm and a linear discriminant analysis (LDA) algorithm.

The authorized user may be the owner of the electronic device 100 or a friend or a relative of the owner. The face template of the authorized user may be a face template pre-stored inside or outside the electronic device 100. The face template can be an infrared image of the face of the authorized user, and the infrared image of the face may be a flat image.

When the face in the infrared image matches the face template of the authorized user, the structured light projector 13 is configured to project a laser to the target object (the outside of the electronic device 100), and the laser pattern of the target object is obtained by the infrared camera 12. The depth template of the authorized user may be a face depth template pre-stored inside or outside the electronic device 100. The depth template may be a face depth image of the authorized user, and the face depth image may be obtained by structured light detection.

When the processor 40 determines that the infrared image matches the face template of the authorized user, it can be considered that the infrared image currently input by the user and the pre-stored face template are from the same user. However, since the face template and the infrared image are both flat images, the infrared image is easy to forge. For example, verification is performed with a two-dimensional photograph. Therefore, the processor 40 further determines whether the depth image of the target object matches the depth template of the authorized user, and thus whether the current user is the authorized user of the pre-stored depth template can be better verified. When the processor 40 determines that the depth image matches the depth template of the authorized user, it is determined that the verification is passed. After the verification is passed, the current user can obtain the corresponding operation authority of the electronic device 100, such as screen unlocking, payment, and the like.

In the existing mobile phone, in order to make the display screen on the front of the mobile phone a full screen, the camera component can be selectively hidden inside the mobile phone or exposed outside the mobile phone. In order to reduce the time for the camera component to perform face unlocking, the camera component is generally turned on frequently for obtaining an image of the user, resulting in a large power consumption of the mobile phone.

In the electronic device 100 and the verification method of the embodiments of the present disclosure, after it is determined that a human face exists in the infrared image and the human face matches the face templet of the authorized user, the laser pattern is obtained by the structured light projector 13 and the infrared camera 12, the depth image is obtained according to the laser pattern and it is determined whether the depth image matches the depth template of the authorized user. Compared to turning on the structured light projector 13 and the infrared camera 12 to obtain the laser pattern simultaneously with determining whether the face matches the authorized user's face, the number of times the structured light projector 13 and the infrared camera 12 are turned on is reduced, thereby further reducing the power consumption of the electronic device 100 and prolonging the service life of the structured light projector 13 and the infrared camera 12.

As illustrated in FIGS. 2, 4 and 5, embodiments of the present disclosure provide a verification device 200. The verification device 200 includes the first determining module 21, the second determining module 22, the third determining module 23, the fourth determining module 24, the verifying module 25 and the obtaining module 27.

The first determining module 21 is configured to determine whether the movable component 10 is triggered. In other words, the act at block 01 may be implemented by the first determining module 21.

The second determining module 22 is configured to determine whether a human face exists in the infrared image after the infrared camera 12 obtains the infrared image. In other words, the act at block 04 may be implemented by the second determining module 22.

The third determining module 23 is configured to determine whether the human face matches the face template of the authorized user when the human face exists in the infrared image. In other words, the act at block 051 may be implemented by the third determining module 23.

The obtaining module 27 is configured to obtain the depth image according to the laser pattern, when the human face matches the face template of the authorized user. In other words, the act at block 0522 may be implemented by the obtaining module 27.

The fourth determining module 24 is configured to determine whether the depth image matches the depth template of the authorized user. In other words, the act at block 0523 may be implemented by the fourth determining module 24. In other words, the act at block 052 may be implemented by the infrared camera 12, the structured light projector 13, the third determining module 23, the obtaining module 27 and the fourth determining module 24 together.

The verifying module 25 is configured to determine that the verification is passed, when the depth image matches the depth template of the authorized user. In other words, the act at block 06 may be implemented by the verifying module 25.

The act at block 021 may be implemented by the bracket 11. The act at block 022 may be implemented by the infrared camera 12 and the structured light projector 13 together. The act at block 02 may be implemented by the bracket 11, the infrared camera 12 and the structured light projector 13 together. The act at block 03 may be implemented by the infrared camera 12. The act at block 0521 may be implemented by the infrared camera 12 and the structured light projector 13 together.

The acts implemented by the first determining module 21, the second determining module 22, the third determining module 23, the fourth determining module 24, the verifying module 25 and the obtaining module 27 may also be implemented by the processor 40.

The first determining module 21 is coupled to the driving component 31, the infrared camera 12 and the structured light projector 13 respectively, so that after the first determining module 21 determines that the movable component 10 is triggered, the first determining module 21 can transmit a signal to the driving component 31, the infrared camera 12 and the structured light projector 13 to drive the driving component 31, the infrared camera 12 and the structured light projector 13 to implement the act at block 02.

The second determining module 22 is coupled to the infrared camera 12 and the structured light projector 13 respectively, so that the infrared image obtained by the infrared camera 12 can be transmitted to the second determining module 22, and the second determining module 22 can transmit a signal to the infrared camera 12 and the structured light projector 13 after determining that a human face exists in the infrared image, such that the act at block 0521 can be implemented by the infrared camera 12 and the structured light projector 13.

The obtaining module 27 is coupled to the infrared camera 12 and the fourth determining module 24 respectively, so that the obtaining module 27 can receive the laser pattern obtained by the infrared camera 12, and the obtaining module 27 can transmit the depth image to the fourth determining module 24 after generating the depth image.

In the verification device 200, the electronic device 100 and the verification method of the embodiments of the present disclosure, after it is determined that a human face exists in the infrared image and the human face matches the face templet of the authorized user, the laser pattern is obtained by the structured light projector 13 and the infrared camera 12, the depth image is obtained according to the laser pattern, and it is determined whether the depth image matches the depth template of the authorized user. Compared to turning on the structured light projector 13 and the infrared camera 12 to obtain the laser pattern while determining whether the face matches the authorized user's face, the number of times the structured light projector 13 and the infrared camera 12 are turned on is reduced, thereby further reducing the power consumption of the electronic device 100 and prolonging the service life of the structured light projector 13 and the infrared camera 12.

As illustrated in FIGS. 2 and 3, in some embodiments, the movable component 10 further includes an infrared fill light 14, and the infrared fill light 14 may be configured to emit infrared light to the outside, and the infrared light is received by the infrared camera 12 after being reflected by the object. In detail, when the infrared camera 12 is configured to obtain the infrared image, the infrared fill light 14 is configured to emit infrared light to the outside, to enhance the intensity of the infrared light received by the infrared camera 12 after being reflected by the object, thereby improving the sharpness of the infrared image.

As illustrated in FIGS. 2 and 3, in some embodiments, the movable component 10 further includes at least one of a front camera 15, a receiver 16, a light sensor 17, a proximity sensor 18, a rear camera 19, and a visible light fill light 191. In this way, the front camera 15, the receiver 16, the light sensor 17, or the proximity sensor 18 are not required to be disposed on the front surface 104 of the housing 101, so that the display screen 105 may be disposed on the entire front surface 104, and in this case, the display screen 105 is a full screen. The rear camera 19 is not required to be disposed on the back surface of the housing 101, so that the back surface of the housing 101 is excellent in overall integrity and the appearance is improved.

In embodiments of the present disclosure, the width W1 of the bracket 11 is equal to the width W2 of the housing 101. The bracket 11 may be an integrative structure to fix the light sensor 17, the infrared fill light 14, the infrared camera 12, the proximity sensor 18, the receiver 16, the rear camera 19, the visible light fill light 191, the front camera 15 and the structured light projector 13. Or, the bracket 11 may include a first sub-bracket structure to fix the light sensor 17, the infrared fill light 14, the infrared camera 12, the proximity sensor 18, the receiver 16, the front camera 15 and the structured light projector 13, and a second sub-bracket structure to fix the rear camera 19 and the visible light fill light 191, and the first sub-bracket is combined with the second sub-bracket. In detail, the first sub-bracket and the second sub-bracket are connected together by at least one or more combinations of screwing, snapping, gluing, and welding. The bracket 11 is provided with a light-passing hole (not shown) at one end corresponding to the head portion 102 (the top surface of the bracket 11), and the light sensor 17 is mounted at a position corresponding to the light-passing hole, such that the light outside of the electronic device 100 (or the bracket 11) can be transmitted to the light sensor 17.

Figure 6:
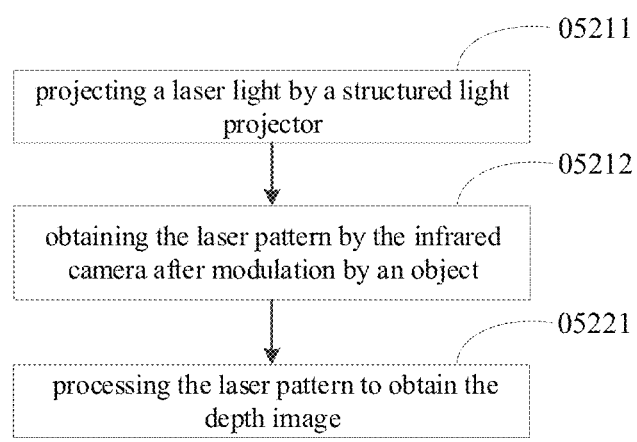

As illustrated in FIG. 6, in some embodiments, the acts of obtaining the laser pattern by the structured light projector 13 and the infrared camera 12 and obtaining the depth image according to the laser pattern (the acts at blocks 0521 and 0522) include the followings.

At block 05211, a laser light is projected by a structured light projector 13.

At block 05212, a laser pattern modulated by an object is obtained by the infrared camera 12.

At block 05221, a depth image is obtained by processing the laser pattern.

The act at block 05211 may be implemented by the structured light projector 13. The act at block 05212 may be implemented by the infrared camera 12. The act at block 05221 may be implemented by the processor 40. In other words, the structured light projector 13 is configured to project the laser light, the infrared camera 12 is configured to obtain the laser pattern modulated by the object, and the processor 40 is configured to process the laser pattern to obtain the depth image.

The processor 40 may store calibration information of the laser light projected by the structured light projector 13. The processor 40 obtains depth information of the target object at different positions by processing the laser pattern and the calibration information, and generates the depth image. The laser light projected by the structured light projector 13 may be infrared light, and the laser pattern is different when the laser light is projected onto different materials for modulation.

For example, when the laser is projected onto human skin, rubber, and wood, the laser pattern obtained after the laser is modulated is different. Therefore, the material information of the target object can also be reflected in the depth image. Only when the material is human skin, the depth image can match the depth template to pass the verification.

As illustrated in FIG. 3, in some embodiments, the acts of determining whether a human face exists in the infrared image is performed in a Trusted Execution Environment (TEE) 41; and/or determining whether the human face in the infrared image matches the face template of the authorized user is performed in the TEE 41; and/or determining whether the depth image matches the depth template of the authorized user is performed in the TEE 41.

The act at block 04, and/or the act at block 051, and/or the act at block 0523 may be performed in the TEE 41. In detail, the processor 40 is further configured to form the TEE 41 and a Rich Execution Environment (REE) 42. The codes and memory regions in the TEE 41 are both controlled by the access control unit and are not accessible by programs in the REE 42. In detail, the TEE 41 can receive an image (infrared image or depth image) transmitted by the infrared camera 12 to the TEE 41, and output a comparison result, and the image data and the program in the TEE 41 cannot be accessed by programs in the REE 42.

In detail, when the act of determining whether a human face exists in the infrared image (the act at block 04) is performed in the TEE 41, the infrared image is transmitted to the TEE 41 for processing to determine whether a human face exists in the infrared image, and the comparison result (i.e., a human face exists in the infrared image, or no human face exists in the infrared image) is output by the TEE 41.

When the act of determining whether the human face in the infrared image matches the face template of the authorized user (the act at block 051) is performed in the TEE 41, the infrared image is transmitted to the TEE 41 for processing to determine whether the human face in the infrared image matches the face template of the authorized user, and the comparison result (i.e., the human face in the infrared image matches the face template of the authorized user, or the human face in the infrared image does not match the face template of the authorized user) is output by the TEE 41. When the act of determining whether the depth image matches the authorized user's depth template (the act at block 0523) is performed in the TEE 41, the depth image is transmitted to the TEE 41 for processing to determine whether the depth image matches the depth template of the authorized user, and the comparison result (i.e., the depth image matches the depth template of the authorized user, or the depth image does not match the depth template of the authorized user) is output by the TEE 41. The comparison result may be transmitted to the REE 42.

The act at block 04, and/or the act at block 051, and/or the act at block 0523 may be performed in the TEE 41, thereby reducing the risk of leakage of the depth image and/or the infrared image caused by the depth image and/or infrared image being read by the REE 42, and improving the security of the electronic device 100.

In some embodiments, the processor 40 includes an application processor (AP) 43 and a microprocessor 44. Both the TEE 41 and the REE 42 are formed on the application processor 43. The microprocessor 44 is coupled to the infrared camera 12 and is configured to obtain the infrared image and the laser pattern. The microprocessor 44 processes the laser pattern to obtain the depth image. In detail, the microprocessor 44 may store the calibration information of the laser light projected by the structured light projector 13. The microprocessor 44 processes the laser pattern and the calibration information to obtain depth information of the target object at different positions and generate the depth image. In detail, the microprocessor 44 and the infrared camera 12 may be coupled via an Inter-Integrated Circuit (I2C) bus 50. The microprocessor 44 may provide the infrared camera 12 with a clock signal for collecting infrared images. The infrared images and the laser patterns collected by the infrared camera 12 may be transmitted to the microprocessor 44 via a Mobile Industry Processor Interface (MIPI) 441. The microprocessor 44 is also coupled to the structured light projector 13, and in particular, the structured light projector 13 may be coupled to a Pulse Width Modulation (PWM) interface 442 of the microprocessor 44. The microprocessor 44 is coupled to the application processor 43 and transmits the infrared images and the depth images to the TEE 41. In other embodiments, the structured light projector 13 may also be coupled to the application processor 43, and the application processor 43 may be configured to enable the structured light projector 13, and is coupled to the structured light projector 13 via the I2C bus 50.

The microprocessor 44 may be a processing chip, and the application processor 43 may be configured to reset the microprocessor 44, wake the microprocessor 44, debug the microprocessor 44, and the like. The microprocessor 44 may be coupled to the application processor 43 via the MIPI 441. In detail, the microprocessor 44 is coupled to the TEE 41 of the application processor 43 via the MIPI 441, to transmit data directly from the microprocessor 44 to the TEE 41.

The microprocessor 44 may obtain the infrared image by receiving the infrared image collected by the infrared camera 12, and the microprocessor 44 may transmit the infrared image to the TEE 41 through the MIPI 441. The infrared image output by the microprocessor 44 would not enter the REE 42 of the application processor 43, so that the infrared image cannot be received by other programs, improving the information security of the electronic device 100. Meanwhile, the application processor 43 determines whether the human face in the infrared image matches the face template in the TEE 41, and then outputs the comparison result. In the process of determining whether the human face matches the face template, the infrared image and the face template cannot be obtained, tampered with or stolen by other programs, and the information security of the electronic device 100 is further improved. Similarly, the depth image and the depth template cannot be obtained, tampered with or stolen by other programs, thereby improving the information security of the electronic device 100.

When the electronic device 100 includes the infrared fill light 14, the infrared fill light 14 may be coupled to the application processor 43 through the I2C bus 50, and the application processor 43 may be configured to enable the infrared fill light 14. The infrared fill light 14 may also be coupled to the microprocessor 44. In detail, the infrared fill light 14 may be coupled to the PWM interface 442 of the microprocessor 44.

Figure 7:
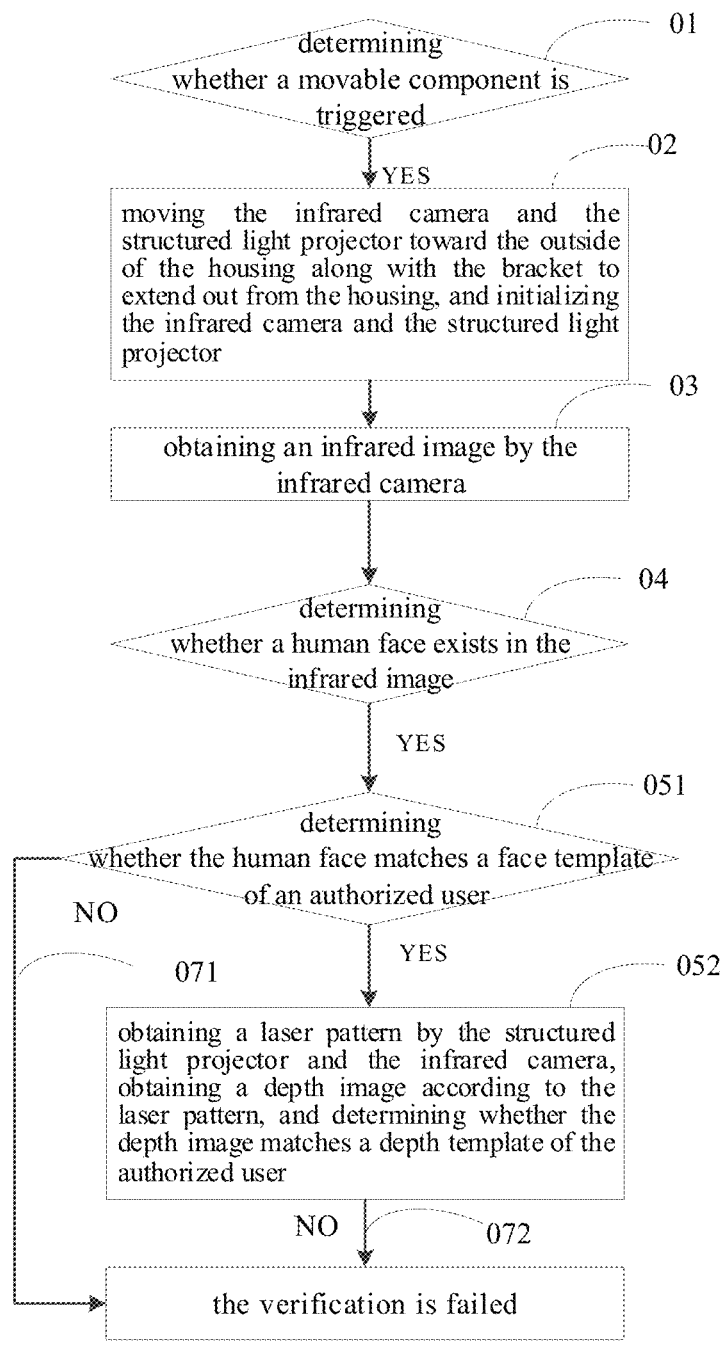

As illustrated in FIGS. 2 and 7, in some embodiments, the verification method further includes the following operations.

At block 071, when the human face in the infrared image does not match the face template of the authorized user, it is determined that the verification is failed.

At block 072, when the depth image does not match the depth template of the authorized user, it is determined that the verification is failed.

The processor 40 is further configured to implement the acts at blocks 071 and 072. In other words, the processor 40 is configured to determine that the verification is failed, when the human face in the infrared image does not match the face template of the authorized user. Or, the processor 40 is configured to determine that the verification is failed, when the depth image does not match the depth template of the authorized user. In other embodiments, the verification method further includes determining that the verification is failed when there is no human face in the infrared image.

In detail, when the human face in the infrared image does not match the face template of the authorized user, or when the depth image does not match the depth template of the authorized user, it is not required to perform the act at block 06. When the verification on the processor 40 fails, the processor 40 may control the display screen 105 to display the prompt message "verification fails, please enter again", or the processor 40 may control the electronic device 100 to generate a predetermined vibration to prompt the user that the verification is failed. In this case, the movable component 10 may remain the state of extending out from the housing 101; or, the movable component 10 may also move back into the housing 101.

Figure 8:
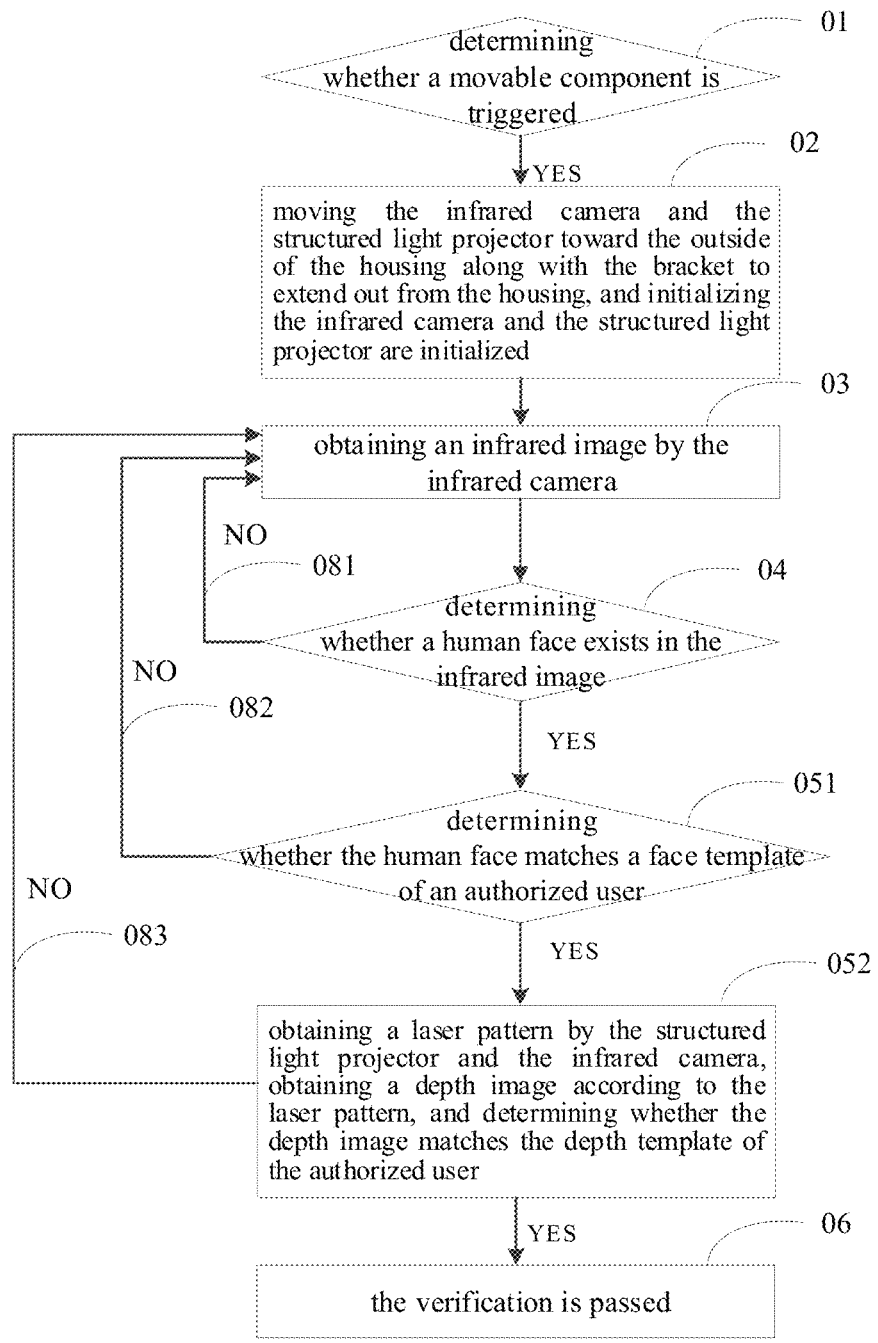

As illustrated in FIG. 8, in some embodiments, the verification method further includes any one of the following operations.

At block 081, when there is no human face in the infrared image, the act of obtaining the infrared image by the infrared camera 12 (the act at block 03) is returned to.

At block 082, when the human face in the infrared image does not match the face template of the authorized user, the act of obtaining the infrared image by the infrared camera 12 (the act at block 03) is returned to.

At block 083, when the depth image does not match the depth template of the authorized user, the act of obtaining the infrared image by the infrared camera 12 (the act at block 03) is returned to.

In detail, the infrared camera 12 is further configured to obtain a new infrared image, when there is no human face in the infrared image, or when the human face in the infrared image does not match the face template of the authorized user, or when the depth image does not match the depth template of the authorized user. For example, after the infrared camera 12 obtains the infrared image, when the processor 40 (or the second determining module 22) determines that the infrared image does not have a human face, the infrared camera 12 reobtains an infrared image (returns to perform the act at block 03); after the infrared camera 12 obtains the infrared image, and the processor 40 (or the second determining module 22) determines that the infrared image has a human face, when the processor 40 (or the third determining module 23) determines that the human face in the infrared image does not match the face template of the authorized user, the infrared camera 12 reobtains an infrared image (returns to perform the act at block 03); after the infrared camera 12 obtains the infrared image, and the processor 40 determines that the infrared image has a human face and determines the human face in the infrared image matches the face template of the authorized user, when the processor 40 (or the fourth determining module 24) determines that the depth image does not match the depth template of the authorized user, the infrared camera 12 reobtains an infrared image (returns to perform the act at block 03). In other embodiments, the verification method further includes: when the human face in the infrared image matches the face template of the authorized user, and the depth image does not match the depth template of the authorized user, returning to perform the act of obtaining the laser pattern by the structured light projector 13 and the infrared camera 12 (the act at block 0521).

In the electronic device 100, the verification device 200 and the verification method of the present embodiment, the infrared camera 12 is further to obtain a new infrared image, when there is no human face in the infrared image, or when the human face in the infrared image does not match the face template of the authorized user, or when the depth image does not match the depth template of the authorized user. The movable component 10 is not required to retract into the housing 101 and then extend out from the housing 101 to enable the infrared camera 12 to obtain the infrared image, thereby reducing the execution time of the verification method.

Figure 9:
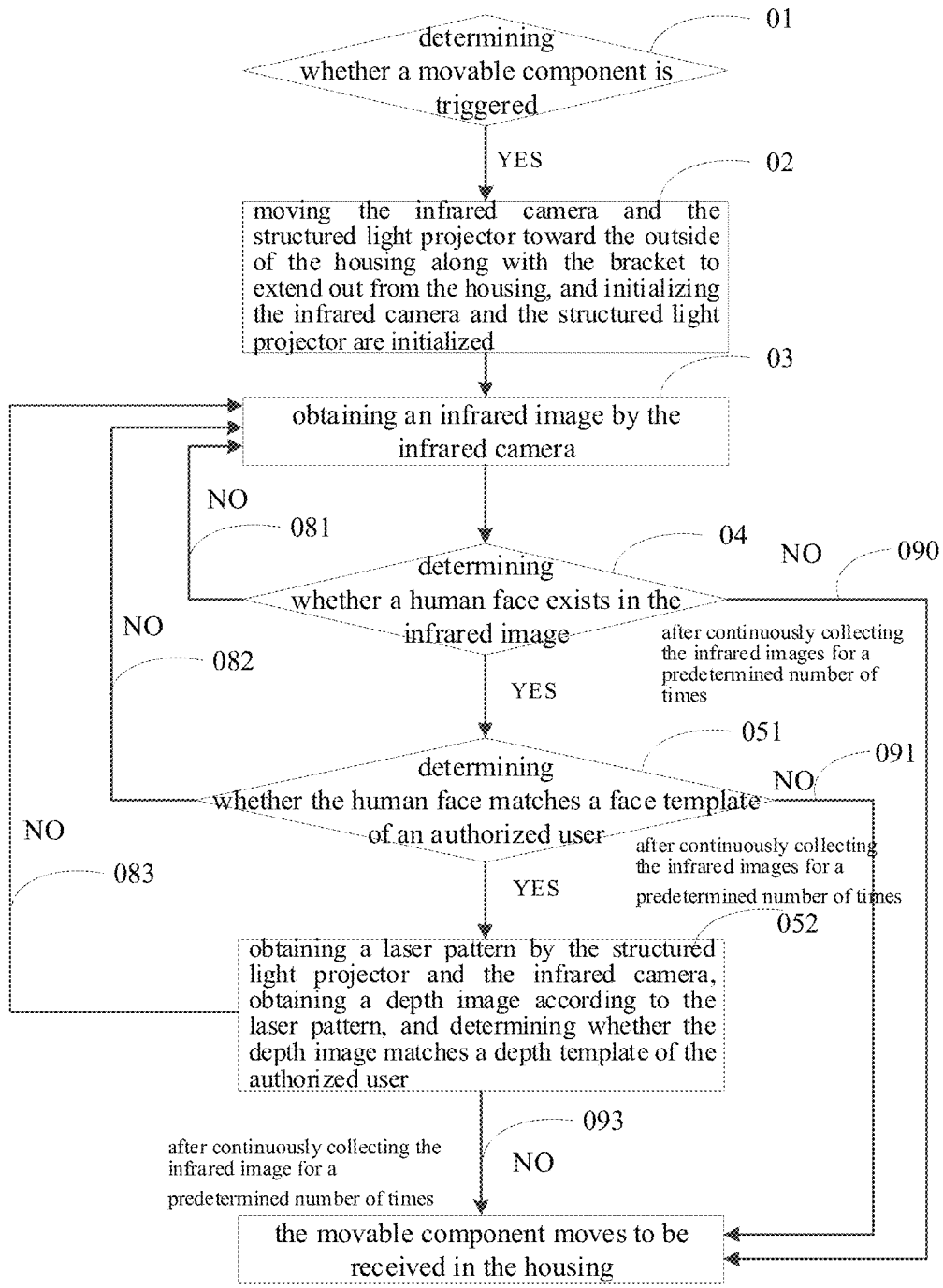

As illustrated in FIG. 9, in some embodiments, after the infrared camera 12 continuously collects the infrared images for a predetermined number of times, the verification method further includes any one of the following operations.

At block 090, when there is no human face in the infrared image, the movable component 10 moves to be received into the housing 101.

At block 091, when the human face in the infrared image does not match the face template of the authorized user, the movable component 10 moves to be received in the housing 101.

At block 092, when the depth image does not match the depth template of the authorized user, the movable component 10 moves to be received into the housing 101.

In detail, after the infrared camera 12 continuously collects the infrared images for a predetermined number of times, the movable component 10 is further configured to move to be received into the housing 101, when there is no human face in the infrared image, or when the human face in the infrared image does not match the face template of the authorized user, or when the depth image does not match the depth template of the authorized user.

The predetermined number of times may be two, three, four, five or any value. The present embodiment is exemplified by taking two as an example. When the movable component 10 is received in the housing 101, and the movable component 10 is triggered, the movable component 10 extends out from the housing 101 to expose the infrared camera 12 outside of the housing 101, the infrared camera 12 obtains an infrared image for the first time, and when there is no human face in the infrared image, the movable component 10 remains exposed outside of the housing 101. In this case, the infrared camera 12 obtains the infrared image for the second time (the act at block 03 is executed again); when the infrared image obtained by the infrared camera 12 at the second time does not have a human face, the movable component 10 moves to be received in the housing 101. When the movable component 10 is received in the housing 101 and the movable component 10 is triggered, the movable component 10 extends out from the housing 101 to expose the infrared camera 12 outside the housing 101, and the infrared camera 12 obtains the infrared image for the first time. When the infrared image does not have a human face, the movable component 10 remains exposed outside of the housing 101. In this case, the infrared camera 12 obtains the infrared image for the second time (the act at block 03 is executed again). When the infrared image obtained by the infrared camera 12 at the second time has a human face, but the human face in the infrared image does not match the face template, the movable component 10 moves to be received in the housing 101. When the movable component 10 is received in the housing 101 and the movable component 10 is triggered, the movable component 10 extends out from the housing 101 to expose the infrared camera 12 outside of the housing 101, and the infrared camera 12 obtains the infrared image for the first time. When the infrared image does not have a human face, the movable component 10 remains exposed outside the housing 101. In this case, the infrared camera 12 obtains the infrared image for the second time (the act at block 03 is executed again). When the infrared image obtained by the infrared camera 12 for the second time has a human face and the human face in the infrared image matches the face template of the authorized user, but the depth image obtained by the structured light projector 13, the infrared camera 12, and the processor 40 (the obtaining module 27) does not match the depth template, the movable component 10 moves to be received in the housing 101.

When the movable component 10 starts moving toward the inside of the housing 101, the infrared camera 12 and the structured light projector 13 are both turned off. In other words, after the infrared camera 12 continuously collects infrared images for a predetermined number of times, the movable component 10 is further configured to turn off the infrared camera 12 and the structured light projector 13, when there is no human face in the infrared image, or when the human face in the infrared image does not match the face template of the authorized user, or when the depth image does not match the depth template of the authorized user.

In the electronic device 100 and the verification method of the present embodiment, after the infrared camera 12 continuously collects the infrared images for a predetermined number of times, the movable component 10 is further configured to move to be received in the housing 101, when there is no human face in the infrared image, or when the human face in the infrared image does not match the face template of the authorized user, or when the depth image does not match the depth template of the authorized user, thereby avoiding continuous working of the infrared camera 12 and/or the structured light projector 13 after multiple verification failures, and avoiding affecting the appearance of the electronic device 100 when the movable component 10 remains exposed outside of the housing 101.

Figure 10:
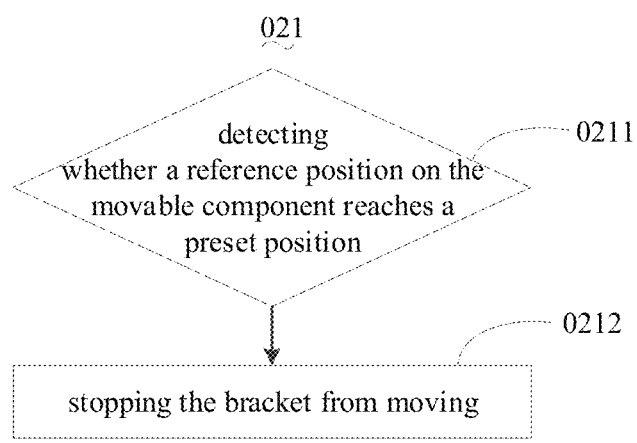
Figure 11:
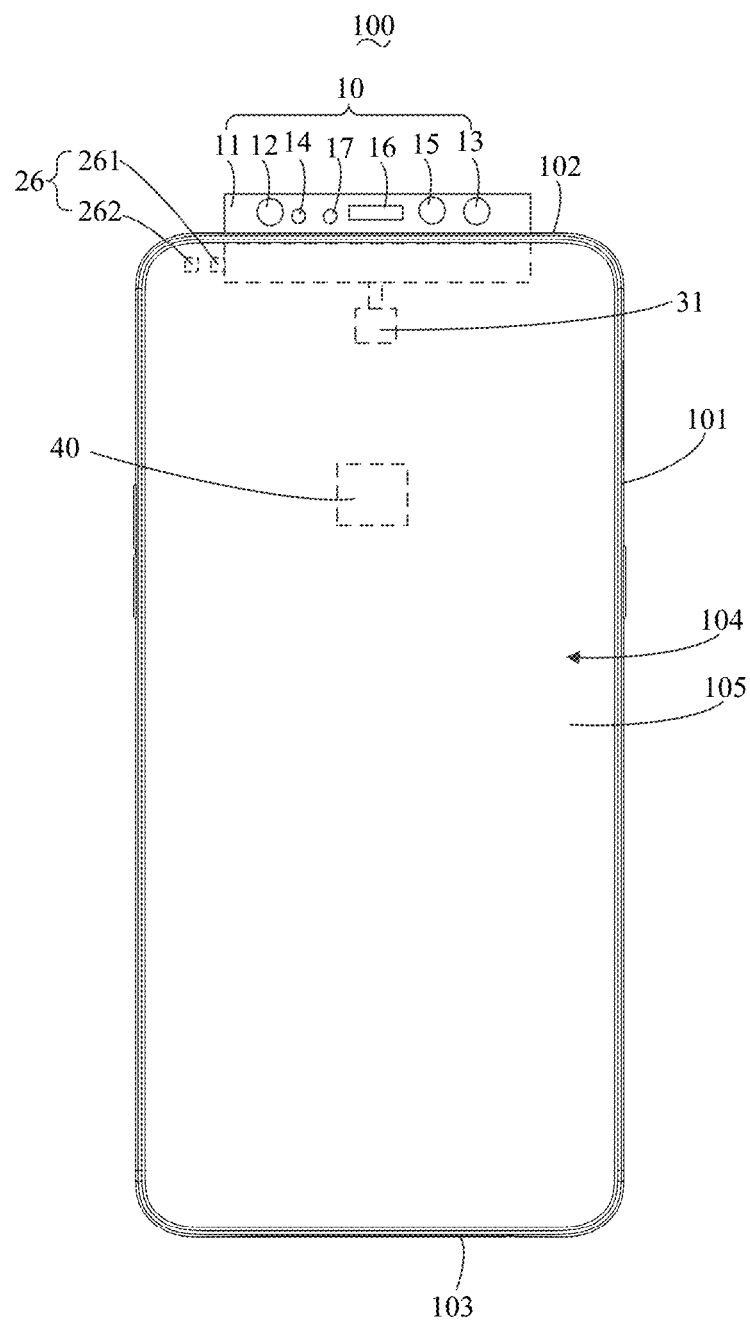
FIG. 11 is a schematic diagram of an electronic device according to embodiments of the present disclosure.

As illustrated in FIGS. 10 and 11, in some embodiments, a reference position is provided on the bracket 11, and moving the infrared camera 12 and the structured light projector 13 toward the outside of the housing 101 along with the bracket to extend from the housing 101 (the act at block 021) includes the following operations.

At block 0211, it is determined whether a reference position on the movable component 10 reaches a preset position.

At block 0212, when the reference position reaches the preset position, the bracket 11 stops moving.

The electronic device 100 further includes a detecting component 26. The reference position is provided on the bracket 11. The detecting component 26 is configured to detect whether the reference position on the movable component 10 reaches the preset position. When the reference position reaches the preset position, the bracket 11 stops moving.

The reference position may be a position at which the limiting portion (e.g., the limiting protrusion) on the bracket 11 and the positioning portion (e.g., the positioning groove) are located. The preset position is a fixed position relative to the housing 101. In detail, the preset position may be a position at which the limiting portion (e.g., the limiting protrusion) on the housing 101 is located. When the movable component 10 is received in the housing 101, the distance between the reference position and the preset position is the maximum stroke of the movable component 10. The detecting component 26 may be a detecting circuit connected with a position switch (which may be a travel switch), the position switch is set at the preset position, and the bracket 11 is provided with a protruding portion capable of triggering the position switch at the reference position. When the reference position of the bracket 11 moves to the preset position, the bracket 11 triggers the position switch, which is detected by the detecting circuit, so that the detecting component 26 can detect whether the reference position of the bracket 11 moves to the preset position.

As illustrated in FIG. 11, in some embodiments, the detection component 26 includes a magnetic element 261, and a Hall sensor 262. The magnetic element 261 is disposed at the reference position. The Hall sensor 262 is disposed at the preset position. In detail, when the magnetic element 261 moves to the preset position, the magnetic element 261 is aligned with the Hall sensor 262 and makes the signal on the Hall sensor 262 changed. It is possible to determine whether the magnetic element 261 (or the bracket 11) reaches the preset position according to the signal change of the Hall sensor 262.

Figure 12:
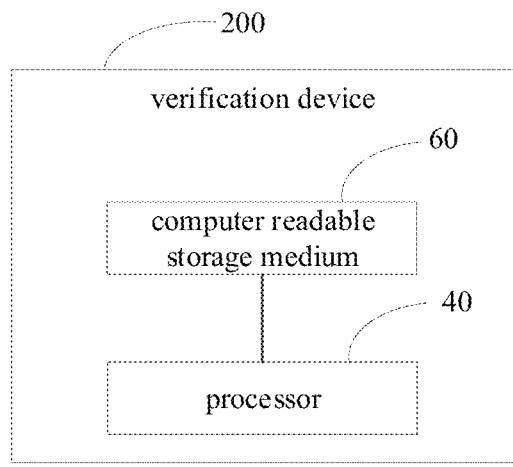
FIG. 12 is a schematic diagram of a verification device according to embodiments of the present disclosure.

As illustrated in FIG. 12, embodiments of the present disclosure further provide a computer readable storage medium 60. The computer readable storage medium 60 is applied to the verification device 200 in the above-described embodiments. The computer readable storage medium 60 is configured to store one or more computer executable instructions. When the one or more computer executable instructions are executed by the processor 40, the processor 40 implements the following operations of:

01, determining whether the movable component 10 is triggered;

02, when the movable component 10 is triggered, controlling the bracket 11 to move toward the outside of the housing 101 along with the infrared camera 12 and the structured light projector 13 to enable the infrared camera 12 and the structured light projector 13 to extend out from the housing 101, and controlling the infrared camera 12 and the structured light projector 13 to be initialized;

03, controlling the infrared camera 12 to obtain an infrared image;

04, determining whether a human face exists in the infrared image;

051, when a human face exists in the infrared image, determining whether the human face matches a face template of an authorized user;

052, when the human face matches the face template of the authorized user, controlling the structured light projector 13 and the infrared camera 12 to obtain a laser pattern, obtaining a depth image according to the laser pattern, and determining whether the depth image matches the depth template of the authorized user; and 06, when the depth image matches the depth template of the authorized user, determining that the verification is passed.

When the one or more computer executable instructions are executed by the processor 40, the processor 40 may further implement the following operations of:

05211, controlling the structured light projector 13 to project laser light;

05212, controlling the infrared camera 12 to obtain the laser pattern after modulation by an object; and 05221, processing the laser pattern to obtain the depth image.

When the one or more computer executable instructions are executed by the processor 40, the processor 40 may further implement the following operations of:

071, when the human face in the infrared image does not match the face template of the authorized user, determining that the verification is failed; or 072, when the depth image does not match the depth template of the authorized user, determining that the verification is failed.

When the one or more computer executable instructions are executed by the processor 40, the processor 40 may further implement the following operations of:

081, when there is no human face in the infrared image, returning to the act of obtaining the infrared image by the infrared camera 12 (the act at block 03); or 082, when the human face in the infrared image does not match the face template of the authorized user, returning to the act of obtaining the infrared image by the infrared camera 12 (the act at block 03); or 083, when the depth image does not match the depth template of the authorized user, returning to the act of obtaining the infrared image by the infrared camera 12 (the act at block 03).

After the infrared camera 12 continuously collects the infrared images for a predetermined number of times, when the one or more computer executable instructions are executed by the processor 40, the processor 40 may further implement the following operations of:

090, when there is no human face in the infrared image, controlling the movable component 10 to move to be received into the housing 101; or 091, when the human face in the infrared image does not match the face template of the authorized user, controlling the movable component 10 to move to be received in the housing 101; or 092, when the depth image does not match the depth template of the authorized user, controlling the movable component 10 to move to be received into the housing 101.

When the one or more computer executable instructions are executed by the processor 40, the processor 40 may further implement the following operations of:

0211, determining whether the reference position on the movable component 10 reaches the preset position; and 0212, when the reference position reaches the preset position, controlling the bracket 11 to stop moving.

In a second embodiment of the present disclosure, when a human face exists in the infrared image, determining whether the human face matches the face template of the authorized user, obtaining the laser pattern by the structured light projector 13 and the infrared camera 12, obtaining the depth image according to the laser pattern, and determining whether the depth image matches the depth template of the authorized user (the act at block 05) may be performed as follows.

At block 053, when a human face exists in the infrared image, it is determined whether the human face matches the face template of the authorized user, and at the same time, the laser pattern is obtained by the structured light projector 13 and the infrared camera 12, the depth image is obtained according to the laser pattern, and it is determined whether the depth image matches the depth template of the authorized user.

Figure 13:
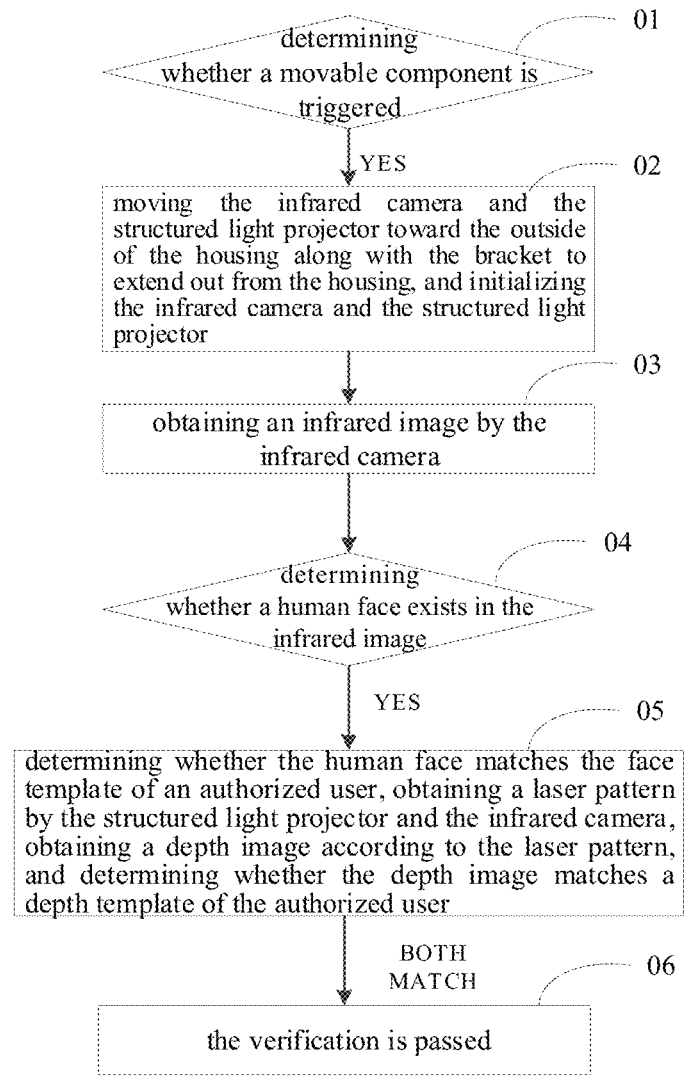
FIGS. 13-17 are schematic flow charts of a verification method according to embodiments of the present disclosure.

As illustrated in FIGS. 1, 3 and 13, in other words, the verification method of the second embodiment of the preset disclosure includes the following operations.

At block 01, it is determined whether the movable component 10 is triggered. The movable component 10 is received in the housing 101 and capable of extending out from the housing 101. The movable component 10 includes the bracket 11, the infrared camera 12 disposed on the bracket 11, and the structured light projector 13 disposed on the bracket 11.

At block 02, when the movable component 10 is triggered, the infrared camera 12 and the structured light projector 13 are driven to move toward the outside of the housing 101 along with the bracket 11 to extend from the housing 101, and the infrared camera 12 and the structured light projector 13 are initialized.

At block 03, an infrared image is obtained by the infrared camera 12.

At block 04, it is determined whether a human face exists in the infrared image.

At block 053, when a human face exists in the infrared image, it is determined whether the human face matches the face template of the authorized user, and at the same time, the laser pattern is obtained by the structured light projector 13 and the infrared camera 12, the depth image is obtained according to the laser pattern, and it is determined whether the depth image matches the depth template of the authorized user.

At block 06, when the human face matches the face template of the authorized user, and the depth image matches the depth template of the authorized user, it is determined that the verification is passed.

The act at block 02 includes the followings.

At block 021, the infrared camera 12 and the structured light projector 13 are moved toward the outside of the housing 101 along with the bracket to extend from the housing 101.

At block 022, the infrared camera 12 and the structured light projector 13 are initialized.

The act at block 053 includes the followings.

At block 0531, when there is a human face in the infrared image, it is determined whether the human face matches the face template of the authorized user.

At block 0532, when there is a human face in the infrared image, the laser pattern is obtained by the structured light projector 13 and the infrared camera 12.

At block 0533, the depth image is obtained according to the laser pattern.

At block 0534, it is determined whether the depth image matches the depth template of the authorized user.

The act at block 0531 is performed synchronously with the act at block 0532. Here, "performed synchronously" means that the startup time of the two acts is the same. In detail, the startup time is a certain time after determining that there is a human face in the infrared image.

As illustrated in FIGS. 2 and 3, the electronic device 100 of embodiments of the present disclosure includes the housing 101, the movable component 10, and the processor 40. The movable component 10 includes the bracket 11, the infrared camera 12, and the structured light projector 13. The processor 40 is coupled to the infrared camera 12 and the structured light projector 13 respectively. The movable component 10 is received in the housing 101 and capable of extending out from the housing 101. In detail, the housing 101 includes a head portion 102 and a tail portion 103 opposed to the head portion 102. The housing 101 further includes a front surface 104 coupling the head portion 102 and the tail portion 103, and a back surface (not shown) opposed to the front surface 104. A display screen 105 is provided on the front surface 104, the display screen 105 is a full screen, and the movable component 10 is disposed at one end of the housing 101 where the head portion 102 is. The electronic device 100 includes any one of a mobile phone, a tablet computer, a smart bracelet, and a smart helmet. The electronic device 100 of embodiments of the present disclosure is exemplified by taking a mobile phone as an example.

The processor 40 is configured to determine whether the movable component 10 is triggered; when the movable component 10 is triggered and the infrared camera obtains an infrared image, determine whether a human face exists in the infrared image; when a human face exists in the infrared image, determine whether the human face matches the face template of the authorized user; when a human face exists in the infrared image and the infrared camera 12 and the structured light projector 13 obtains the laser patter, obtain the depth image according to the laser pattern; determine whether the depth image matches the depth template of the authorized user; when the human face matches the face template of the authorized user, and the depth image matches the depth template of the authorized user, determine that the verification is passed. In other words, the acts at blocks 01, 04, 0531, 0533, 0534 and 06 may be implemented by the processor 40.

When the movable component 10 is triggered, the bracket 11 moves with the infrared camera 12 and the structured light projector 13 toward the outside of the housing 101 to enable the infrared camera 12 and the structured light projector 13 to extend out from the housing 101. The infrared camera 12 and the structured light projector 13 are initialized. In other words, the act at block 021 may be implemented by the bracket 11, the act at block 022 may be implemented by the infrared camera 12 and the structured light projector 13 together, and the act at block 02 may be implemented by the bracket 11, the infrared camera 12 and the structured light projector 13 together. First, the bracket 11 moves with the infrared camera 12 and the structured light projector 13 toward the outside of the housing 101 to enable the infrared camera 12 and the structured light projector 13 to extend out from the housing 101, and then the infrared camera 12 and the structured light projector 13 are initialized. In other words, the act at block 021 is performed before the act at block 022. In another case, the bracket 11 moves with the infrared camera 12 and the structured light projector 13 toward the outside of the housing 101 to enable the infrared camera 12 and the structured light projector 13 to extend out from the housing 101, while the infrared camera 12 and the structured light projector 13 are initialized. In other words, the acts at blocks 021 and 022 are performed at the same time, which brings the preparation time (initialization) of the infrared camera 12 and the structured light projector 13 forward to reduce the overall execution time of the verification method, compared to performing the act at block 021 before the act at block 022.

The infrared camera 12 is capable of obtaining the infrared image. In detail, the infrared camera 12 is configured to obtain the infrared image after the movable component 10 is triggered. In other words, the act at block 03 may be implemented by the infrared camera 12.

The infrared camera 12 and the structured light projector 13 may be configured together to obtain the laser pattern. In detail, the infrared camera 12 and the structured light projector 13 are configured together to obtain the laser pattern when the human face exists in the infrared image. In other words, the act at block 0532 may be implemented by the infrared camera 12 and the structured light projector 13 together.

The operation of triggering the movable component 10 includes: moving and/or turning the electronic device 100 in a predetermined manner (e.g., the user turns the head portion 102 toward the side of the front surface 104); lighting up the display screen 105 (e.g., when the display screen 105 is in a black-out state, the user lights up the display screen 105 by pressing a button on the electronic device 100 or the user lights up the display screen 105 by double clicking the display screen 105); opening the face detection application in the electronic device 100 (e.g., the user opens/clicks the face detection application or software in the electronic device 100, in detail, when the user uses the electronic device 100, the user can open the user verification software in the electronic device 100 to identify the face of the user to determine whether the user has the right to use the electronic device 100); and clicking a button/key for starting the face detection in the application running in the electronic device 100 (e.g., when the user uses the payment software, the user clicks a button in the payment software to make payment by scanning the face). In detail, the operation of triggering the movable component 10 is also an operation of starting the infrared camera 12 and the structured light projector 13. In other words, the infrared camera 12 and the structured light projector 13 are turned on when the user performs the above operations (moving and/or turning the electronic device 100 in a predetermined manner, lighting up the display screen 105, opening the face detection application in the electronic device 100, clicking a button/key for starting the face detection in the application running in the electronic device 100), and the initialization operation starts after the infrared camera 12 and the structured light projector 13 are turned on. When the user needs to perform face recognition using the infrared camera 12 and the structured light projector 13, the user performs the above operations (moving and/or turning the electronic device 100 in a predetermined manner, lighting up the display screen 105, opening the face detection application in the electronic device 100, clicking a button/key for starting the face detection in the application running in the electronic device 100) that generate a trigger signal for triggering the movable component 10, and the processor 40 may determine whether the movable component 10 is triggered according to whether the trigger signal is received.

The electronic device 100 further includes a driving component 31 disposed within the housing 101 and coupled to the bracket 11. The driving component 31 is configured to drive the bracket 11 to move. The driving component 31 includes a drive motor. The processor 40 is coupled to the driving component 31 and controls the driving component 31 to drive the movable component 10 to move when the movable component 10 is triggered.

The initialization of the infrared camera 12 and the structured light projector 13 includes starting the driving procedure of the infrared camera 12 to prepare the infrared camera 12 for shooting, and starting the driving procedure of the structured light projector 13 to prepare the structured light projector 13 for projecting the infrared laser.

The infrared camera 12 may obtain an infrared image when the bracket 11 moves into position and stops moving. Since the infrared image is obtained when the bracket 11 is stable, the infrared image is relatively clear, which is advantageous for performing subsequent face determination and reduces repeated shooting of infrared images. The infrared camera 12 may also obtain an infrared image when the infrared camera 12 is completely exposed outside the housing 101 and the bracket 11 has not stopped moving. For example, when the infrared camera 12 is completely exposed outside the housing 101 and the moving speed of the bracket 11 is less than one-third of the maximum speed of the bracket 11, the infrared camera 12 obtains an infrared image, and thus, the time for shooting the image is advanced, which further reduces the overall execution time of the verification method, and improves the user experience.

The act of determining whether a human face exists in the infrared image may include: performing feature extraction on the infrared image by using a specific algorithm, matching the extracted feature with a known face feature vector, and determining whether the infrared image is a face image according to the matching result. The features of the infrared image can be extracted by an active shape model (ASM), a local binary patterns (LBP) algorithm, a principal component analysis (PCA) algorithm and a linear discriminant analysis (LDA) algorithm.

The authorized user may be the owner of the electronic device 100 or a friend or a relative of the owner. The face template of the authorized user may be a face template pre-stored inside or outside the electronic device 100. The face template may be an infrared image of the face of the authorized user, and the infrared image of the human face may be a flat image.

When the face exists in the infrared image, the structured light projector 13 is configured to project a laser light to the target object (the outside of the electronic device 100), and the laser pattern of the target object is obtained by the infrared camera 12. The depth template of the authorized user may be a face depth template pre-stored inside or outside the electronic device 100. The depth template may be a face depth image of the authorized user, and the face depth image may be obtained by structured light detection.

When the processor 40 determines that the infrared image matches the face template of the authorized user, it can be considered that the infrared image currently input by the user and the pre-stored face template are from the same user. However, since the face template and the infrared image are both flat images, the infrared image is easy to forge. For example, verification may be performed with a two-dimensional photograph. Therefore, it is further determined by the processor 40 whether the depth image of the target object matches the depth template of the authorized user, which better verifies whether the current user is the user in the pre-stored depth template. When the processor 40 determines that the depth image matches the depth template of the authorized user, it is determined that the verification is passed. After the verification is passed, the current user can obtain the corresponding operation authority of the electronic device 100, such as screen unlocking, payment, and the like.

In the existing mobile phone, in order to make the display screen on the front of the mobile phone a full screen, the camera component can be selectively hidden inside the mobile phone or exposed outside the mobile phone. In this case, when face unlocking is performed by using the camera component, the face unlocking takes a long time, resulting in a poor user experience.

In the electronic device 100, the verification device 200 and the verification method of the embodiments of the present disclosure, after determining that a human face exists in the infrared image, the act of determining whether the human face matches the face templet of the authorized user, and the act of obtaining the laser pattern by the structured light projector 13 and the infrared camera 12 are performed at the same time, which reduces the execution time of the verification method and enhances the verification speed.

As illustrated in FIGS. 2, 4 and 13, embodiments of the present disclosure further provide a verification device 200. The verification device 200 includes the first determining module 21, the second determining module 22, the third determining module 23, the fourth determining module 24, the verifying module 25 and the obtaining module 27.

The first determining module 21 is configured to determine whether the movable component 10 is triggered. In other words, the act at block 01 may be implemented by the first determining module 21.

The second determining module 22 is configured to determine whether a human face exists in the infrared image after the infrared camera 12 obtains the infrared image. In other words, the act at block 04 may be implemented by the second determining module 22.

The third determining module 23 is configured to determine whether the human face matches the face template of the authorized user when the human face exists in the infrared image. In other words, the act at block 0531 may be implemented by the third determining module 23.

The obtaining module 27 is configured to obtain the depth image according to the laser pattern, when the human face exists in the infrared image. In other words, the act at block 0533 may be implemented by the obtaining module 27.

The fourth determining module 24 is configured to determine whether the depth image matches the depth template of the authorized user. In other words, the act at block 0534 may be implemented by the fourth determining module 24. In other words, the act at block 053 may be implemented by the infrared camera 12 and the structured light projector 13, the third determining module 23, the obtaining module 27 and the fourth determining module 24 together.

The verifying module 25 is configured to determine that the verification is passed, when the depth image matches the depth template of the authorized user, and the human face matches the face template of the authorized user. In other words, the act at block 06 may be implemented by the verifying module 25.

The act at block 021 may be implemented by the bracket 11. The act at block 022 may be implemented by the infrared camera 12 and the structured light projector 13 together. The act at block 02 may be implemented by the bracket 11, the infrared camera 12 and the structured light projector 13 together. The act at block 03 may be implemented by the infrared camera 12. The act at block 0532 may be implemented by the infrared camera 12 and the structured light projector 13 together.

The acts implemented by the first determining module 21, the second determining module 22, the third determining module 23, the fourth determining module 24, the verifying module 25 and the obtaining module 27 may also be implemented by the processor 40.

The first determining module 21 is coupled to the driving component 31, the infrared camera 12 and the structured light projector 13 respectively, so that after the first determining module 21 determines that the movable component 10 is triggered, the first determining module 21 can transmit a signal to the driving component 31, the infrared camera 12 and the structured light projector 13 to drive the driving component 31, the infrared camera 12 and the structured light projector 13 to implement the act at block 02.

The second determining module 22 is coupled to the infrared camera 12 and the structured light projector 13 respectively, so that the infrared image obtained by the infrared camera 12 can be transmitted to the second determining module 22, and the second determining module 22 can transmit a signal to the infrared camera 12 and the structured light projector 13 after determining that a human face exists in the infrared image, to drive the infrared camera 12 and the structured light projector 13 to implement the act at block 0532.

The obtaining module 27 is coupled to the infrared camera 12 and the fourth determining module 24 respectively, so that the obtaining module 27 can receive the laser pattern obtained by the infrared camera 12, and the obtaining module 27 can transmit the depth image to the fourth determining module 24 after generating the depth image.

In the verification device 200, the electronic device 100 and the verification method of the embodiments of the present disclosure, after determining that a human face exists in the infrared image, the act of determining whether the human face matches the face templet of the authorized user and the act of obtaining the laser pattern by the structured light projector 13 and the infrared camera 12 are performed at the same time, which reduces the execution time of the verification method and enhances the verification speed.

As illustrated in FIGS. 2 and 3, in some embodiments, the movable component 10 further includes an infrared fill light 14, and the infrared fill light 14 may be configured to emit infrared light to the outside, and the infrared light is received by the infrared camera 12 after being reflected by the object. In detail, when the infrared camera 12 is configured to obtain an infrared image, the infrared fill light 14 is configured to emit infrared light outward to enhance the intensity of the infrared light received by the infrared camera 12 after modulation by the object, thereby improving the sharpness of the infrared image.

As illustrated in FIGS. 2 and 3, in some embodiments, the movable component 10 further includes at least one of a front camera 15, a receiver 16, a light sensor 17, a proximity sensor 18, a rear camera 19, and a visible light fill light 191. Thus, the front camera 15, the receiver 16, the light sensor 17, or the proximity sensor 18 are not required to be disposed on the front surface 104 of the housing 101, so that the display screen 105 can be disposed on the entire front surface 104, in which case the display screen 105 is a full screen. The rear camera 19 is not required to be disposed on the back surface of the housing 101, so that the back surface of the housing 101 is excellent in overall integrity and the appearance is improved.

In the present embodiment, the width W1 of the bracket 11 is equal to the width W2 of the housing 101. The bracket 11 may be an integrative structure to fix the light sensor 17, the infrared fill light 14, the infrared camera 12, the proximity sensor 18, the receiver 16, the rear camera 19, the visible light fill light 191, the front camera 15 and the structured light projector 13. Or, the bracket 11 may include a first sub-bracket structure to fix the light sensor 17, the infrared fill light 14, the infrared camera 12, the proximity sensor 18, the receiver 16, the front camera 15 and the structured light projector 13, and a second sub-bracket structure to fix the rear camera 19 and the visible light fill light 191, and the first sub-bracket is combined with the second sub-bracket. In detail, the first sub-bracket and the second sub-bracket are connected together by at least one or more combinations of screwing, snapping, gluing, and welding. The bracket 11 is provided with a light-passing hole (not shown) at one end corresponding to the head portion 102 (the top surface of the bracket 11), and the light sensor 17 is mounted at a position corresponding to the light-passing hole, such that the light outside of the electronic device 100 (or the bracket 11) can be transmitted to the light sensor 17.

Figure 14:
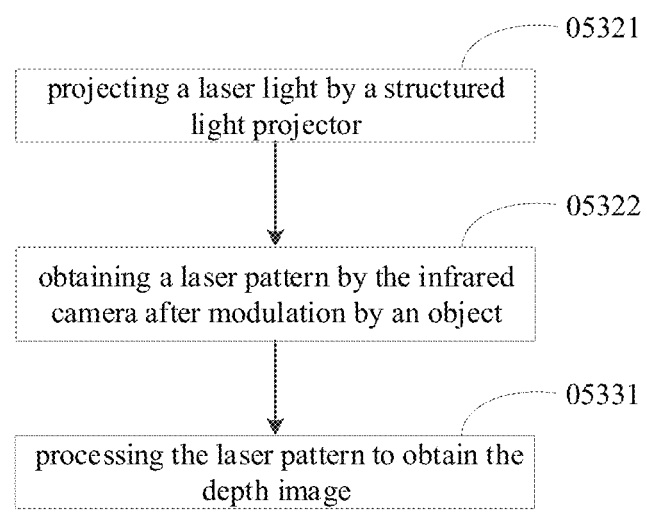

As illustrated in FIG. 14, in some embodiments, the acts of obtaining the laser pattern by the structured light projector 13 and the infrared camera 12 and obtaining the depth image according to the laser pattern (the acts at blocks 0532 and 0533) include the followings.

At block 05321, a laser light is projected by the structured light projector 13.

At block 05322, the laser pattern is obtained by the infrared camera 12 after modulation by an object.

At block 05331, a depth image is obtained by processing the laser pattern.

The act at block 05321 may be implemented by the structured light projector 13. The act at block 05322 may be implemented by the infrared camera 12. The act at block 05331 may be implemented by the processor 40. In other words, the structured light projector 13 is configured to project the laser light, the infrared camera 12 is configured to obtain the laser pattern after modulation by an object, and the processor 40 is configured to process the laser pattern to obtain the depth image.

The processor 40 may store calibration information of the laser light projected by the structured light projector 13. The processor 40 obtains depth information of the target object at different positions by processing the laser pattern and the calibration information, and generates the depth image. The laser light projected by the structured light projector 13 may be infrared light, and the laser pattern is different when the laser light is projected onto different materials for modulation. For example, when the laser is projected onto human skin, rubber, or wood, the laser pattern after modulation is different. Therefore, the material information of the target object can also be reflected in the depth image. Only when the material is human skin, the depth image can match the depth template to pass the verification.

As illustrated in FIG. 3, in some embodiments, determining whether a human face exists in the infrared image is performed in the Trusted Execution Environment (TEE) 41; and/or determining whether the human face in the infrared image matches the face template of the authorized user is performed in the TEE 41; and/or determining whether the depth image matches the depth template of the authorized user is performed in the TEE 41.

The act at block 04, and/or the act at block 0531, and/or the act at block 0534 are performed in the TEE 41. In detail, the processor 40 is further configured to form the TEE 41 or the Rich Execution Environment (REE) 42. The codes and memory regions in the TEE 41 are both controlled by the access control unit and are not accessible by programs in the REE 42. In detail, the TEE 41 can receive an image (infrared image or depth image) transmitted by the infrared camera 12 to the TEE 41, and output a comparison result, and the image data and the program in the TEE 41 cannot be accessed by programs in the REE 42.

In detail, when the act of determining whether a human face exists in the infrared image (the act at block 04) is executed in the TEE 41, the infrared image is transmitted to the TEE 41 for processing to determine whether a human face exists in the infrared image, and the comparison result is output by the TEE 41 (i.e., a human face exists in the infrared image, or there is no human face in the infrared image); when the act of determining whether the human face in the infrared image matches the face template of the authorized user (the act at block 0531) is executed in the TEE 41, the infrared image is transmitted to the TEE 41 for processing to determine whether the human face in the infrared image matches the face template of the authorized user, and the comparison result is output by the TEE 41 (i.e., the human face in the infrared image matches the face template of the authorized user, or the human face in the infrared image does not match the face template of the authorized user); when the act of determining whether the depth image matches the authorized user's depth template (the act at block 0534) is executed in the TEE 41, the depth image is transmitted to the TEE 41 for processing to determine whether the depth image matches the depth template of the authorized user, and the comparison result is output by the TEE 41 (i.e., the depth image matches the depth template of the authorized user, or the depth image does not match the depth template of the authorized user). The comparison results may be transmitted to the REE 42.

In the present embodiment, the act at block 04, and/or the act at block 0531, and/or the act at block 0534 are executed in the TEE 41, thereby reducing the risk of leakage of the depth image and/or the infrared image caused by the depth image and/or the infrared image being read by the REE 42, and improving the security of the electronic device 100.

In some embodiments, the processor 40 includes an application processor (AP) 43 and a microprocessor 44. Both the TEE 41 and the REE 42 are formed on the application processor 43. The microprocessor 44 is coupled to the infrared camera 12 and is configured to obtain an infrared image and a laser pattern. The microprocessor 44 processes the laser pattern to obtain a depth image. In detail, the microprocessor 44 may store the calibration information of the laser light projected by the structured light projector

13. The microprocessor 44 processes the laser pattern and the calibration information to obtain depth information of the target object at different positions and generate the depth image. In detail, the microprocessor 44 and the infrared camera 12 may be coupled by an Inter-Integrated Circuit (I2C) bus 50. The microprocessor 44 may provide the infrared camera 12 with a clock signal for collecting infrared images. The infrared images and the laser patterns collected by the infrared camera 12 can be transmitted to the microprocessor 44 via a Mobile Industry Processor Interface (MIPI) 441. The microprocessor 44 is also coupled to the structured light projector 13, and in particular, the structured light projector 13 may be coupled to a Pulse Width Modulation (PWM) interface 442 of the microprocessor 44. The microprocessor 44 is coupled to the application processor 43 and transmits the infrared images and the depth images to the TEE 41. In other embodiments, the structured light projector 13 may also be coupled to the application processor 43, the application processor 43 may be configured to enable the structured light projector 13 and is coupled to the structured light projector 13 via the I2C bus 50.

The microprocessor 44 may be a processing chip, and the application processor 43 may be configured to reset the microprocessor 44, wake the microprocessor 44, debug the microprocessor 44, and the like. The microprocessor 44 may be coupled to the application processor 43 via the MIPI 441. In detail, the microprocessor 44 is coupled to the TEE 41 of the application processor 43 via the MIPI 441 to transmit data directly from the microprocessor 44 to the TEE 41.

The microprocessor 44 may obtain the infrared image by receiving the infrared image collected by the infrared camera 12, and the microprocessor 44 may transmit the infrared image to the TEE 41 through the MIPI 441. The infrared image output by the microprocessor 44 would not enter the REE 42 of the application processor 43, so that the infrared image cannot be received by other programs, and the information security of the electronic device 100 is improved. Meanwhile, the application processor 43 determines whether the human face in the infrared image matches the face template in the TEE 41, and then outputs the comparison result. In the process of determining whether the human face matches the face template, the infrared image and the face template cannot be obtained, tampered with or stolen by other programs, and thus the information security of the terminal 100 is further improved. Similarly, the depth image and the depth template cannot be obtained, tampered with or stolen by other programs, thereby improving the information security of the electronic device 100.

When the electronic device 100 includes the infrared fill light 14, the infrared fill light 14 may be coupled to the application processor 43 through the I2C bus 50. The application processor 43 may be configured to enable the infrared fill light 14. The infrared fill light 14 may also be coupled to the microprocessor 44. In detail, the infrared fill light 14 may be coupled to the PWM interface 442 of the microprocessor 44.

Figure 15:
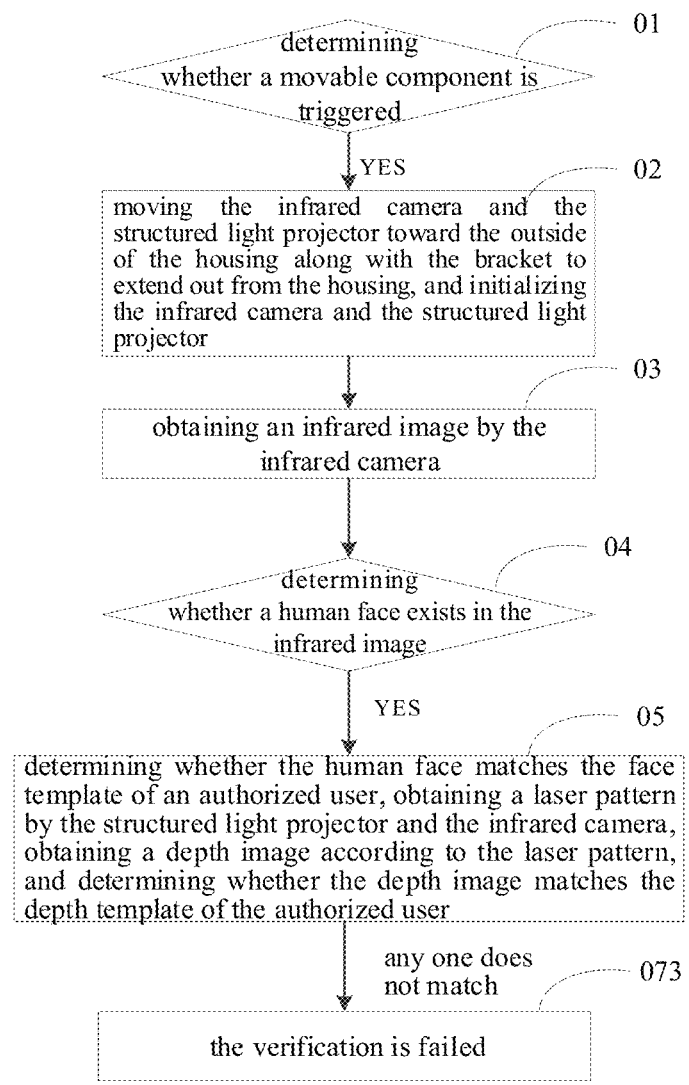

As illustrated in FIGS. 2 and 15, in some embodiments, the verification method further includes the following operations.

At block 073, when the human face in the infrared image does not match the face template of the authorized user, the verification is failed, and/or when the depth image does not match the depth template of the authorized user, the verification is failed.

The act at block 073 may be implemented by the processor 40. In other words, the processor 40 is configured to determine that the verification is failed, when the human face in the infrared image does not match the face template of the authorized user, and/or the processor 40 is configured to determine that the verification is failed, when the depth image does not match the depth template of the authorized user. In other embodiments, the act at block 073 further includes determining that the verification is failed, when there is no human face in the infrared image.

In detail, when the human face in the infrared image does not match the face template of the authorized user, or when the depth image does not match the depth template of the authorized user, the act at block 06 is not required to be executed. When the verification on the processor 40 fails, the processor 40 may control the display screen 105 to display the prompt message "verification fails, please enter again", or the processor 40 may control the electronic device 100 to generate a predetermined vibration to prompt the user that the verification is failed. In this case, the movable component 10 may remain the state of extending out from the housing 101; or, the movable component 10 may also move back into the housing 101.

Figure 16:
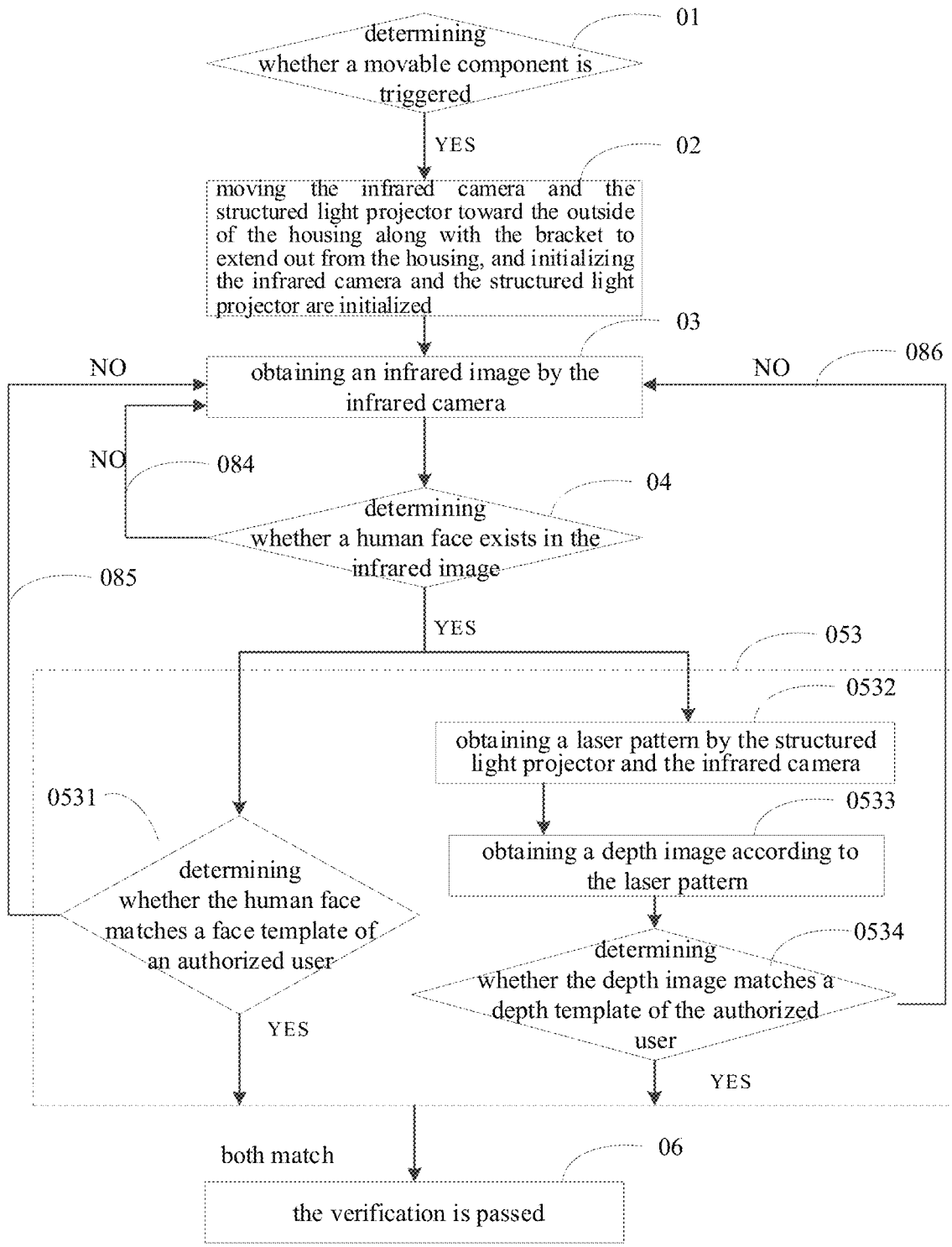

As illustrated in FIG. 16, in some embodiments, the verification method further includes at least one of the following operations.

At block 084, when there is no human face in the infrared image, the act of obtaining the infrared image by the infrared camera 12 (the act at block 03) is returned to.

At block 085, when the human face in the infrared image does not match the face template of the authorized user, the act of obtaining the infrared image by the infrared camera 12 (the act at block 03) is returned to.

At block 086, when the depth image does not match the depth template of the authorized user, the act of obtaining the infrared image by the infrared camera 12 (the act at block 03) is returned to.

In detail, the infrared camera 12 is further configured to obtain a new infrared images, when there is no human face in the infrared image, or when the human face in the infrared image does not match the face template of the authorized user, and/or when the depth image does not match the depth template of the authorized user. For example, after the infrared camera 12 obtains the infrared image, when the processor 40 (or the second determining module 22) determines that no human face exists in the infrared image, the infrared camera 12 reacquires the infrared image (the act at block 03 is executed again); after the infrared camera 12 obtains the infrared image, and the processor 40 (or the second determining module 22) determines that a human face exists in the infrared image, when the processor 40 (or the third determining module 23) determines that the human face in the infrared image does not match the face template of the authorized user, the infrared camera 12 reacquires the infrared image (the act at block 03 is executed again); after the infrared camera 12 obtains the infrared image, and the processor 40 determines that the infrared image has a human face and determines that the human face in the infrared image matches the face template of the authorized user, when the processor 40 (or the fourth determining module 24) determines that the depth image does not match the depth template of the authorized user, the infrared camera 12 reacquires the infrared image (the act at block 03 is executed again). In other embodiments, the verification method further includes: when the human face in the infrared image matches the face template of the authorized user, and the depth image does not match the depth template of the authorized user, the act of obtaining the laser pattern by the structured light projector 13 and the infrared camera 12 is executed (the act at block 0532).

In the verification device 200, the electronic device 100 and the verification method of the present embodiment, the infrared camera 12 is further configured to obtain a new infrared image, when there is no human face in the infrared image, or when the human face in the infrared image does not match the face template of the authorized user, and/or when the depth image does not match the depth template of the authorized user. The movable component 10 is not required to retract into the housing 101 and then extend out from the housing 101 to enable the infrared camera 12 to acquire an infrared image, thereby reducing the execution time of the verification method, and increasing the success rate of verification.

Figure 17:
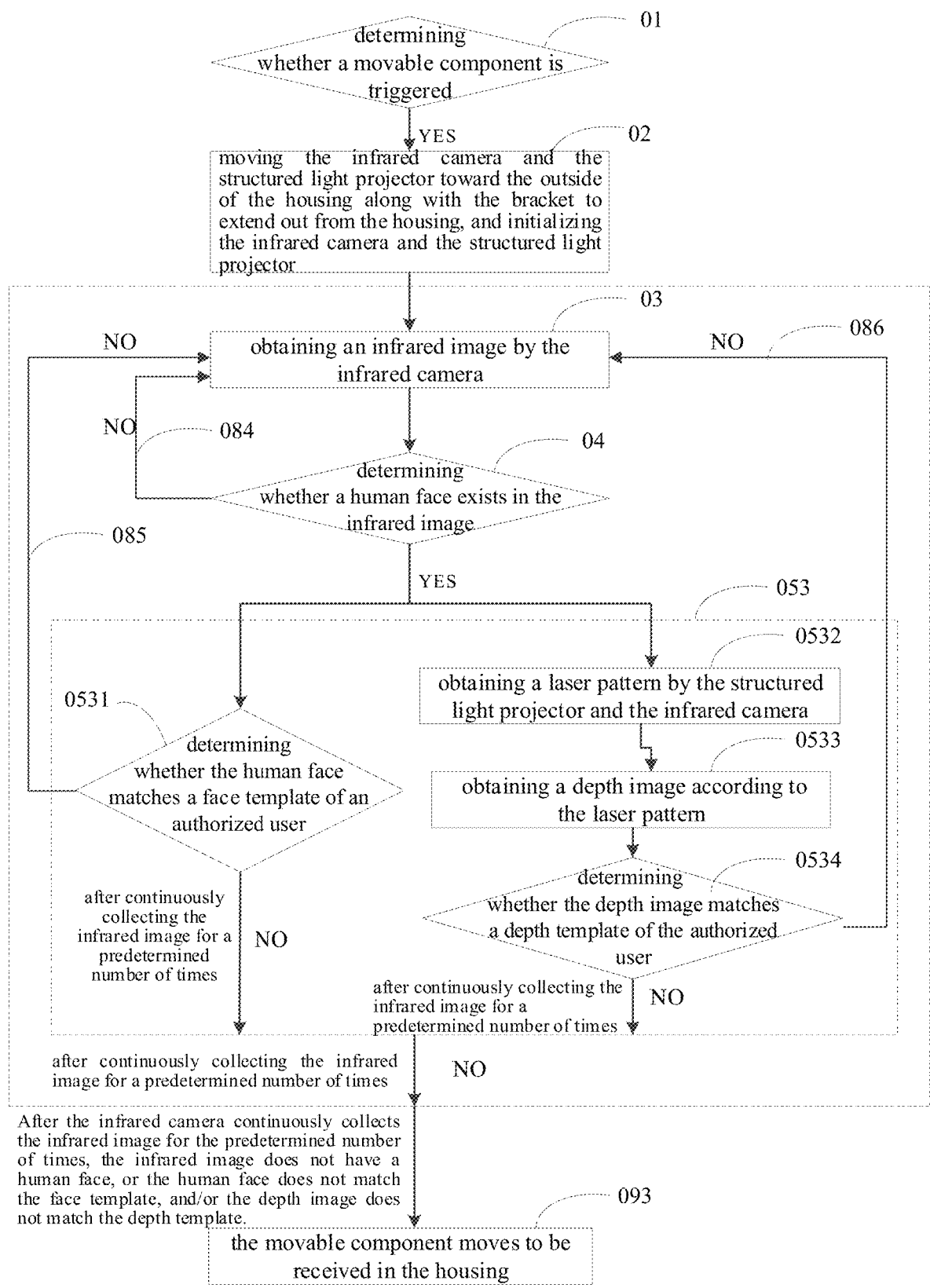

As illustrated in FIG. 17, in some embodiments, after the infrared camera 12 continuously collects the infrared image for the predetermined number of times, the verification method further includes the following operations.

At block 093, when there is no human face in the infrared image, the movable component 10 moves to be received into the housing 101; or when the human face in the infrared image does not match the face template of the authorized user, the movable component 10 moves to be received in the housing 101; and/or, when the depth image does not match the depth template of the authorized user, the movable component 10 moves to be received into the housing 101.

In detail, after the infrared camera 12 continuously collects the infrared image for the predetermined number of times, the movable component 10 is further configured to move to be received into the housing 101, when there is no human face in the infrared image, or when the human face in the infrared image does not match the face template of the authorized user, and/or when the depth image does not match the depth template of the authorized user.

The predetermined number of times may be two, three, four, five or any value. The present embodiment is exemplified by taking two as an example. When the movable component 10 is received in the housing 101, and the movable component 10 is triggered, the movable component 10 extends out from the housing 101 to expose the infrared camera 12 outside of the housing 101, and the infrared camera 12 obtains an infrared image for the first time. When there is no human face in the infrared image, the movable component 10 remains exposed outside of the housing 101. In this case, the infrared camera 12 obtains the infrared image for the second time (the act at block 03 is executed again). When the infrared image obtained by the infrared camera 12 for the second time does not have a human face, the movable component 10 moves to be received in the housing 101. When the movable component 10 is received in the housing 101 and the movable component 10 is triggered, the movable component 10 extends out from the housing 101 to expose the infrared camera 12 outside of the housing 101, and the infrared camera 12 obtains the infrared image for the first time. When the infrared image does not have a human face, the movable component 10 remains exposed outside of the housing 101. In this case, the infrared camera 12 obtains the infrared image for the second time (the act at block 03 is executed again). When the infrared image obtained by the infrared camera 12 for the second time has a human face, but the human face in the infrared image does not match the face template, the movable component 10 moves to be received in the housing 101. When the movable component 10 is received in the housing 101 and the movable component 10 is triggered, the movable component 10 extends out of the housing 101 to expose the infrared camera 12 outside the housing 101, and the infrared camera 12 obtains the infrared image for the first time. When the infrared image does not have a human face, the movable component 10 remains exposed outside the housing 101. In this case, the infrared camera 12 obtains the infrared image for the second time (the act at block 03 is executed again). When the infrared image obtained by the infrared camera 12 for the second time has a human face, but the depth image obtained by the structured light projector 13, the infrared camera 12, and the processor 40 (the obtaining module 27) does not match the depth template, the movable component 10 moves to be received in the housing 101. When the movable component 10 is received in the housing 101 and the movable component 10 is triggered, the movable component 10 extends out of the housing 101 to expose the infrared camera 12 outside the housing 101, and the infrared camera 12 obtains the infrared image for the first time. When the infrared image does not have a human face, the movable component 10 remains exposed outside the housing 101. In this case, the infrared camera 12 obtains the infrared image for the second time (the act at block 03 is executed again). When the infrared image obtained by the infrared camera 12 for the second time has a human face, but the human face in the infrared image obtained for the second time does not match the face template and the depth image obtained by the structured light projector 13, the infrared camera 12, and the processor 40 (the obtaining module 27) does not match the depth template, the movable component 10 moves to be received in the housing 101.

When the movable component 10 starts moving toward the inside of the housing 101, the infrared camera 12 and the structured light projector 13 are both turned off. In other words, after the infrared camera 12 continuously collects the infrared image for the predetermined number of times, the movable component 10 is further configured to enable the infrared camera 12 and the structured light projector 13 to be turned off, when there is no human face in the infrared image, or when the human face in the infrared image does not match the face template of the authorized user, and/or when the depth image does not match the depth template of the authorized user.

In the verification device 200, the electronic device 100 and the verification method of the present embodiment, after the infrared camera 12 continuously collects the infrared image for the predetermined number of times, the movable component 10 is further configured to move to be received in the housing 101, when there is no human face in the infrared image, or when the human face in the infrared image does not match the face template of the authorized user, and/or when the depth image does not match the depth template of the authorized user, thereby avoiding the continuous working of the infrared camera 12 and/or the structured light projector 13 after multiple verification failures, and avoiding affecting the appearance of the electronic device 100 when the movable component 10 remains exposed outside of the housing 101.

As illustrated in FIGS. 10 and 11, in some embodiments, a reference position is provided on the bracket 11, and moving the infrared camera 12 and the structured light projector 13 toward the outside of the housing 101 along with the bracket to extend from the housing 101 (the act at block 021) includes the following operations.

At block 0211, it is determined whether the reference position on the movable component 10 reaches the preset position.

At block 0212, when the reference position reaches the preset position, the bracket 11 stops moving.

The electronic device 100 further includes a detecting component 26, and the reference position is provided on the bracket 11. The detecting component 26 is configured to detect whether the reference position on the movable component 10 reaches the preset position. When the reference position reaches the preset position, the bracket 11 stops moving.

The reference position may be a position at which the limiting portion (e.g., the limiting protrusion) on the bracket 11 and the positioning portion (e.g., the positioning groove) are located. The preset position is a fixed position relative to the housing 101. In detail, the preset position may be a position at which the limiting portion (e.g., the limiting protrusion) on the housing 101 is located. When the movable component 10 is received in the housing 101, the distance between the reference position and the preset position is the maximum stroke of the movable component 10. The detecting component 26 may be a detecting circuit connected with a position switch (which may be a travel switch), the position switch is set at the preset position, and the bracket 11 is provided with a protruding portion capable of triggering the position switch at the reference position. When the reference position on the bracket 11 moves to the preset position, the bracket 11 triggers the position switch, which is detected by the detecting circuit, so that the detecting component 26 can detect whether the reference position on the bracket 11 moves to the preset position.

As illustrated in FIG. 11, in some embodiments, the detection component 26 includes a magnetic element 261, and a Hall sensor 262. The magnetic element 261 is disposed at the reference position. The Hall sensor 262 is disposed at the preset position. In detail, when the magnetic element 261 moves to the preset position, the magnetic element 261 is aligned with the Hall sensor 262 and makes the signal on the Hall sensor 262 changed. Whether the magnetic element 261 (or the bracket 11) reaches the preset position can be determined according to the signal change of the Hall sensor 262.

As illustrated in FIG. 12, embodiments of the present disclosure further provide a computer readable storage medium 60. The computer readable storage medium 60 is applied to the verification device 200 in the above-described embodiments. The computer readable storage medium 60 is configured to store one or more computer executable instructions. When the one or more computer executable instructions are executed by one or more processors 40, the processor 40 implements the following operations of

01, determining whether the movable component 10 is triggered;

02, when the movable component 10 is triggered, controlling the bracket 11 to move toward the outside of the housing 101 along with the infrared camera 12 and the structured light projector 13 to enable the infrared camera 12 and the structured light projector 13 to extend out from the housing 101, and controlling the infrared camera 12 and the structured light projector 13 to be initialized;

03, controlling the infrared camera 12 to obtain an infrared image;

04, determining whether a human face exists in the infrared image;

053, when a human face exists in the infrared image, determining whether the human face matches the face template of the authorized user, and obtaining a laser pattern by the structured light projector 13 and the infrared camera 12, obtaining a depth image according to the laser pattern, and determining whether the depth image matches the depth template of the authorized user; and

06, when the human face matches the face template of the authorized user, and the depth image matches the depth template of the authorized user, determining that the verification is passed.

When the computer executable instructions are executed by the one or more processors 40, the processor 40 further implements the following operations of:

05321, controlling the structured light projector 13 to project a laser light;

05322, controlling the infrared camera 12 to obtain the laser pattern after modulation by an object; and

05331, processing the laser pattern to obtain the depth image.

When the computer executable instructions are executed by the one or more processors, the processor 40 further implements the following operations of:

073, when the human face in the infrared image does not match the face template of the authorized user, determining that the verification is failed, and/or, when the depth image does not match the depth template of the authorized user, determining that the verification is failed.

When the computer executable instructions are executed by the one or more processors, the processor 40 further implements the following operations of:

084, when there is no human face in the infrared image, returning to the act of obtaining the infrared image by the infrared camera 12 (the act at block 03); or

085, when the human face in the infrared image does not match the face template of the authorized user, returning to the act of obtaining the infrared image by the infrared camera 12 (the act at block 03); and/or

086, when the depth image does not match the depth template of the authorized user, returning to the act of obtaining the infrared image by the infrared camera 12 (the act at block 03).

After the infrared camera 12 continuously collects the infrared image for the predetermined number of times, when the one or more computer executable instructions are executed by the one or more processors 40, the processors 40 further implements the following operations of:

093, when there is no human face in the infrared image, controlling the movable component 10 to move to be received into the housing 101; or when the human face in the infrared image does not match the face template of the authorized user, controlling the movable component 10 to move to be received in the housing 101; and/or, when the depth image does not match the depth template of the authorized user, controlling the movable component 10 to move to be received into the housing 101.

When the computer executable instructions are executed by the one or more processors, the processor 40 further implements the following operations of:

0211, determining whether a reference position on the movable component 10 reaches the preset position; and

0212, when the reference position reaches the preset position, controlling the bracket 11 to stop moving.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

The flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, when it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A verification method, comprising:
    determining whether a movable component is triggered, wherein the movable component is received in a housing and capable of extending out from the housing, the movable component includes a bracket, an infrared camera disposed on the bracket and a structured light projector disposed on the bracket;
    when the movable component is triggered, moving the infrared camera and the structured light projector towards the outside of the housing along with the bracket to extend out from the housing, and initializing the infrared camera and the structured light projector;
    obtaining an infrared image by the infrared camera;
    determining whether a human face exists in the infrared image;
    when a human face exists in the infrared image, determining whether the human face matches a face template of an authorized user, obtaining a laser pattern by the structured light projector and the infrared camera, obtaining a depth image according to the laser pattern, and determining whether the depth image matches a depth template of the authorized user; and
    when the human face matches the face template of the authorized user, and the depth image matches the depth template of the authorized user, determining that verification is passed.

2. The verification method according to claim 1, wherein, when the human face exists in the infrared image, determining whether the human face matches the face template of the authorized user, obtaining the laser pattern by the structured light projector and the infrared camera, obtaining the depth image according to the laser pattern, and determining whether the depth image matches the depth template of the authorized user, comprises:
    when the human face exists in the infrared image, determining whether the human face matches the face template of the authorized user; and
    when the human face matches the face template of the authorized user, obtaining the laser pattern by the structured light projector and the infrared camera, obtaining the depth image according to the laser pattern, and determining whether the depth image matches the depth template of the authorized user.

3. The verification method according to claim 1, wherein when the human face exists in the infrared image, determining whether the human face matches the face template of the authorized user, obtaining the laser pattern by the structured light projector and the infrared camera, obtaining the depth image according to the laser pattern, and determining whether the depth image matches the depth template of the authorized user, comprises:
  when the human face exists in the infrared image, determining whether the human face matches the face template of the authorized user simultaneously with obtaining the laser pattern by the structured light projector and the infrared camera, obtaining the depth image according to the laser pattern, and determining whether the depth image matches the depth template of the authorized user.

4. The verification method according to claim 1, wherein one or more of the following:
  determining whether the human face exists in the infrared image is performed in a trusted execution environment;
  determining whether the human face in the infrared image matches the face template of the authorized user is performed in the trusted execution environment; and
  determining whether the depth image matches the depth template of the authorized user is performed in the trusted execution environment.

5. The verification method according to claim 1, further comprising one of the following:
  when the human face in the infrared image does not match the face template of the authorized user, determining that the verification is failed;
  when the depth image does not match the depth template of the authorized user, determining that the verification is failed; and
  when the human face in the infrared image does not match the face template of the authorized user, and the depth image does not match the depth template of the authorized user, determining that the verification is failed.

6. The verification method according to claim 1, further comprising one of the following:
  when no human face exists in the infrared image, returning to the act of obtaining the infrared image by the infrared camera;
  when the human face does not match the face template of the authorized user, returning to the act of obtaining the infrared image by the infrared camera;
  when the depth image does not match the depth template of the authorized user, returning to the act of obtaining the infrared image by the infrared camera; and
  when the human face in the infrared image does not match the face template of the authorized user, and the depth image does not match the depth template of the authorized user, returning to the act of obtaining the infrared image by the infrared camera.

7. The verification method according to claim 6, after the infrared camera continuously obtains the infrared image for a predetermined number of times, further comprising one of the following:
  when no human face exists in the infrared image, moving the movable component to be received into the housing;
  when the human face does not match the face template of the authorized user, moving the movable component to be received into the housing;
  when the depth image does not match the depth template of the authorized user, moving the movable component to be received into the housing; and
  when the human face in the infrared image does not match the face template of the authorized user, and the depth image does not match the depth template of the authorized user, moving the movable component to be received into the housing.

8. The verification method according to claim 1, wherein a reference position is provided on the bracket, and moving the infrared camera and the structured light projector towards the outside of the housing along with the bracket to extend out from the housing comprises:
  determining whether the reference position on the movable component reaches a preset position; and
  when the reference position reaches the preset position, stopping the bracket from moving.

9. An electronic device, comprising:
  a housing;
  a movable component, wherein the movable component is received in the housing and capable of extending out from the housing, and the movable component comprises:
    a bracket;
    an infrared camera disposed on the bracket; and
    a structured light projector disposed on the bracket,
    wherein, when the movable component is triggered, the bracket is configured to move toward the outside of the housing along with the infrared camera and the structured light projector to enable the infrared camera and the structured light projector to extend out from the housing, the infrared camera and the structured light projector are configured to be initialized,
    wherein, the infrared camera is further configured to obtain an infrared image, and the infrared camera and the structured light projector are further configured to obtain a laser pattern; and
  a processor, configured to:
  determine whether the movable component is triggered;
  determine whether a human face exists in the infrared image;
  when the human face exists in the infrared image, determine whether the human face matches a face template of an authorized user, obtain a depth image according to the laser pattern, and determine whether the depth image matches a depth template of the authorized user; and
  when the human face matches the face template of the authorized user, and the depth image matches the depth template of the authorized user, determine that verification is passed.

10. The electronic device according to claim 9, wherein the processor is configured to:
  when the human face exists in the infrared image, determine whether the human face matches the face template of the authorized user; and
  when the human face matches the face template of the authorized user, obtain the depth image according to the laser pattern, and determine whether the depth image matches the depth template of the authorized user.

11. The electronic device according to claim 9, wherein the processor is configured to:
  when the human face exists in the infrared image, determine whether the human face matches the face template of the authorized user; and
  when the human face exists in the infrared image, obtain the depth image according to the laser pattern, and determine whether the depth image matches the depth template of the authorized user.

12. The electronic device according to claim 9, wherein the processor is further configured to generate a trusted execution environment, and one of the following:
  determine whether a human face exists in the infrared image in the trusted execution environment;

determine whether the human face in the infrared image matches the face template of the authorized user in the trusted execution environment; and determine whether the depth image matches the depth template of the authorized user in the trusted execution environment.

13. The electronic device according to claim 9, wherein the processor is further configured to perform one of the following:

determine that the verification is failed, when the human face does not match the face template of the authorized user;

determine that the verification is failed, when the depth image does not match the depth template of the authorized user; and determine that the verification is failed, when the human face does not match the face template of the authorized user, and the depth image does not match the depth template of the authorized user.

14. The electronic device according to claim 9, wherein the infrared camera is further configured to perform one of the following:

obtain a new infrared image, when no human face exists in the infrared image;

obtain a new infrared image, when the human face does not match the face template of the authorized user;

obtain a new infrared image, when the depth image does not match the depth template of the authorized user; and obtain a new infrared image, when the human face does not match the face template of the authorized user, and the depth image does not match the depth template of the authorized user.

15. The electronic device according to claim 14, wherein after the infrared camera continuously obtains the infrared image for a predetermined number of times, the movable component is further configured to perform one of the following:

move to be received in the housing, when no human face exists in the infrared image does not contain a human face;

move to be received in the housing, when the human face does not match the face template of the authorized user;

move to be received in the housing, when the depth image does not match the depth template of the authorized user; and to move to be received in the housing, when the human face does not match the face template of the authorized user, and the depth image does not match the depth template of the authorized user.

16. The electronic device according to claim 9, wherein the electronic device further comprises a detecting component;

a reference position is provided on the bracket;

wherein the detecting component is configured to detect whether the reference position on the movable component reaches a preset position; and wherein the bracket is configured to stop moving, when the reference position reaches the preset position.

17. The electronic device according to claim 16, wherein the detecting component comprises a magnetic element and a Hall sensor, the magnetic element is disposed at the reference position, and the Hall sensor is disposed at the preset position.

18. The electronic device according to claim 9, wherein the electronic device comprises any one of a mobile phone, a tablet computer, a smart bracelet, and a smart helmet.

19. A verification device, comprising:

a processor; and a memory, configured to store instructions executable by the processor, wherein the processor is configured to run a program corresponding to the instructions by reading the instructions stored in the memory, so as to:

determine whether a movable component is triggered, wherein the movable component is received in the housing and capable of extending out from the housing, the movable component comprises a bracket, an infrared camera disposed on the bracket and a structured light projector disposed on the bracket;

when the movable component is triggered, control the bracket to move toward the outside of the housing together with the infrared camera and the structured light projector to enable the infrared camera and the structured light projector to extend out from the housing, and control the infrared camera and the structured light projector to be initialized;

control the infrared camera to obtain an infrared image;

determine whether a human face exists in the infrared image;

when a human face exists in the infrared image, determine whether the human face matches a face template of an authorized user, control the infrared camera and the structured light projector to obtain a laser pattern, obtain a depth image according to the laser pattern, and determine whether the depth image matches a depth template of the authorized user; and determine that verification is passed, when the human face matches the face template of the authorized user, and the depth image matches the depth template of the authorized user.

20. The verification device according to claim 19, wherein the processor is configured to control the infrared camera and the structured light projector to obtain the laser patter simultaneously with determining whether the human face matches the face template of the authorized user, or after determining that the human face matches the face template of the authorized user.

* * * * *